United States Patent
Ohta et al.

(10) Patent No.: US 11,758,414 B2
(45) Date of Patent: *Sep. 12, 2023

(54) RADIO TERMINAL, RADIO COMMUNICATION SYSTEM, AND RADIO COMMUNICATION METHOD

(71) Applicant: FUJITSU LIMITED, Kawasaki (JP)

(72) Inventors: Yoshiaki Ohta, Yokohama (JP); Yoshiharu Tajima, Yokohama (JP); Akira Ito, San Jose, CA (US)

(73) Assignee: FUJITSU LIMITED, Kawasaki (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/094,610

(22) Filed: Nov. 10, 2020

(65) Prior Publication Data
US 2021/0058803 A1 Feb. 25, 2021

Related U.S. Application Data

(63) Continuation of application No. 16/419,626, filed on May 22, 2019, now Pat. No. 10,869,208, which is a
(Continued)

(51) Int. Cl.
*H04W 24/02* (2009.01)
*H04W 48/20* (2009.01)
(Continued)

(52) U.S. Cl.
CPC ............ *H04W 24/02* (2013.01); *H04W 24/08* (2013.01); *H04W 24/10* (2013.01); *H04W 48/20* (2013.01); *H04W 52/0216* (2013.01); *H04W 76/28* (2018.02); *Y02D 30/70* (2020.08)

(58) Field of Classification Search
CPC ..... H04W 24/02; H04W 24/08; H04W 24/10; H04W 48/20; H04W 52/0216; H04W 76/28
See application file for complete search history.

(56) References Cited

U.S. PATENT DOCUMENTS

| 5,781,612 A | 7/1998 | Choi et al. |
| 6,377,803 B1 | 4/2002 | Ruohonen |

(Continued)

FOREIGN PATENT DOCUMENTS

| CN | 101584191 A | 11/2009 |
| CN | 101730205 A | 6/2010 |

(Continued)

OTHER PUBLICATIONS

First Notification of Office Action and Search Report issued by the China National Intellectual Property Administration for corresponding Chinese Patent Application No. 201811425397.3, dated Apr. 21, 2021, with an English translation.

(Continued)

*Primary Examiner* — Min Jung
(74) *Attorney, Agent, or Firm* — Myers Wolin, LLC

(57) ABSTRACT

A radio terminal that performs radio communication with a base station, including: a communicator configured to perform radio measurement and monitoring of a paging signal; and a controller configured to control the communicator to receive information related to first duration by Non-Access Stratum (NAS) message from the base station, and not to perform the radio measurement and the monitoring during the first duration but to perform the radio measurement and the monitoring during second duration different from the first duration, wherein the controller is further configured to control the radio measurement and the monitoring by ending the first duration for transmitting uplink data of the radio terminal.

8 Claims, 24 Drawing Sheets

Related U.S. Application Data continuation of application No. 15/013,434, filed on Feb. 2, 2016, now Pat. No. 10,349,292, which is a continuation of application No. 14/322,434, filed on Jul. 2, 2014, now Pat. No. 9,301,187, which is a continuation of application No. PCT/JP2012/050540, filed on Jan. 13, 2012.

(51) Int. Cl.
| | |
|---|---|
| *H04W 52/02* | (2009.01) |
| *H04W 76/28* | (2018.01) |
| *H04W 24/08* | (2009.01) |
| *H04W 24/10* | (2009.01) |

(56) References Cited

U.S. PATENT DOCUMENTS

| | | | |
|---|---|---|---|
| 6,823,191 | B2 | 11/2004 | Laroia et al. |
| 8,521,194 | B2 | 8/2013 | Laroia et al. |
| 8,601,156 | B2 | 12/2013 | Laroia et al. |
| 8,780,732 | B2 | 7/2014 | Song et al. |
| 8,903,383 | B2 * | 12/2014 | Farnsworth ........... H04W 60/04 455/434 |
| 9,407,391 | B2 * | 8/2016 | Jain ....................... H04W 72/10 |
| 2003/0153271 | A1 | 8/2003 | Brandt et al. |
| 2008/0167089 | A1 * | 7/2008 | Suzuki ............... H04W 36/0088 455/574 |
| 2008/0181127 | A1 | 7/2008 | Terry et al. |
| 2009/0203376 | A1 | 8/2009 | Sambhwani et al. |
| 2009/0323607 | A1 | 12/2009 | Park et al. |
| 2010/0130237 | A1 | 5/2010 | Kitazoe et al. |
| 2010/0317345 | A1 | 12/2010 | Futaki et al. |
| 2011/0201343 | A1 | 8/2011 | Pinheiro et al. |
| 2011/0294436 | A1 | 12/2011 | Ono et al. |
| 2013/0084845 | A1 | 4/2013 | Kimura et al. |
| 2013/0315122 | A1 * | 11/2013 | Sirotkin ................ H04W 36/14 370/311 |

FOREIGN PATENT DOCUMENTS

| | | |
|---|---|---|
| EP | 1108315 A1 | 6/2001 |
| EP | 1944923 A2 | 7/2008 |
| EP | 1944985 A | 7/2008 |
| EP | 1944985 A1 | 7/2008 |
| EP | 2250836 A2 | 11/2010 |
| JP | 2001-86545 A | 3/2001 |
| JP | 2002-524921 A | 8/2002 |
| JP | 2005-518165 A | 6/2005 |
| JP | 2010-098581 A | 4/2010 |
| JP | 2010-226540 A | 10/2010 |
| JP | 2011-511586 A | 4/2011 |
| JP | 2011-109540 A | 6/2011 |
| JP | 2011-166838 A | 8/2011 |
| JP | 2011-193524 A | 9/2011 |
| JP | 2011-254206 A | 12/2011 |
| JP | 2012-010202 A | 1/2012 |
| JP | 2013-524563 A | 6/2013 |
| WO | 2000013377 A1 | 3/2000 |
| WO | 2007/080627 A1 | 7/2007 |
| WO | 2008114977 A1 | 9/2008 |
| WO | 2009100136 A2 | 8/2009 |
| WO | 2010110302 A1 | 9/2010 |
| WO | 2011/100570 | 8/2011 |
| WO | 2011/116849 A1 | 9/2011 |
| WO | 2011/124304 A1 | 10/2011 |

OTHER PUBLICATIONS

3GPP TS 36.300 V11.0.0, 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11), Dec. 2011.

3GPP TR 36.913 V9.0.0 (Dec. 2009) 3rd Generation Partnership Project; Technical Specification Group Radio Access Network; Requirements for further advancements for Evolved Universal Terrestrial Radio Access (E-UTRA) (LTE-Advanced) (Release 9).

3GPP TR 36.912 V9.3.0 (Jun. 2010) 3rd Generation Partnership Project; Technical Specification Group Radio Access Network; Feasibility study for Further Advancements for E-UTRA (LTE-Advanced) (Release 9).

3GPP TS 36.300 V10.4.0, (Jun. 2011), 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10).

3GPP TS 36.304 V10.2.0, (Jun. 2011), 3rd Generation Partnership Project; Technical Specification Group Radio Access Network; Evolved Universal Terrestrial Radio Access (E-UTRA); User Equipment (UE) procedures in idle mode (Release 10).

3GPP TS 36.133 V10.3.0, (Jun. 2011), 3rd Generation Partnership Project; Technical Specification Group Radio Access Network; Evolved Universal Terrestrial Radio Access (E-UTRA); Requirements for support of radio resource management (Release 10).

3GPP TS 36.331 V10.4.0, (Dec. 2011), 3rd Generation Partnership Project; Technical Specification Group Radio Access Network; Evolved Universal Terrestrial Radio Access (E-UTRA); Radio Resource Control (RRC); Protocol specification (Release 10).

3GPP TS 24.301 V10.3.0, (Jun. 2011), 3rd Generation Partnership Project; Technical Specification Group Core Network and Terminals; Non-Access-Stratum (NAS) protocol for Evolved Packet System (EPS); Stage 3 (Release 10).

3GPP TS 36.133 V10.5.0, (Dec. 2011), 3rd Generation Partnership Project; Technical Specification Group Radio Access Network; Evolved Universal Terrestrial Radio Access (E-UTRA); Requirements for support of radio resource management (Release 10).

International Search Report issued by Japan Patent Office for corresponding international application PCT/JP2012/050540, dated Feb. 21, 2012.

3GPP TSG-RAN WG2 Meeting #86, R2-142911, Seoul, South Korea, May 19-23, 2014. Change Request 36.304 (8 pages).

3GPP TSG-RAN WG2 Meeting #86, R2-142910, Seoul, South Korea, May 19-23, 2014, Change Request 25.304 (7 pages).

Office Action issued by Japan Patent Office for Japanese Patent Application No. 2013-553159, dated Aug. 26, 2014 (with English translation of relevant part: p. 1 line 17 to p. 2 line 30).

NIT Docomo et al.; "Views on DRX/DTX control in LTE"; 3GPP Draft; R2-063397, 3rd Generation Partnership Project (3GPP); 3GPP TSG RAN WG2 #56; Nov. 2006. [Cited in the EESR filed herewith].

Extended European Search Report dated Jun. 18, 2015 for corresponding European Application No. 12864938.1.

Korean Office Action dated Jul. 23, 2015 for corresponding Korean Patent Application No. 10-2014-7019012 with English translation.

3GPP; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10)"; 3GPP TS 36.300 V10.6.0; Dec. 2011; pp. 1-194.

Office Action issued by the Canadian Intellectual Property Office for corresponding Canadian Patent Application No. 2,862,789, dated Dec. 4, 2015.

Office Action issued by the Japan Patent Office for corresponding Japanese Patent Application No. 2016-033728, dated Nov. 22, 2016, with a partial English translation.

Nokia Siemens Networks, "Extended Paging cycles", Agenda Item: 9.4 System Improvements for Machine-Type Communications (SIMTC), 3GPP TSG SA WG2 Meeting #84, TD S2-111793, Bratislava, Slovakia, Apr. 11-15, 2011.

Nokia Siemens Networks et al. "Extended Paging Cycles", Agenda Item: 9.4.2.3., 3GPP SA WG2 Meeting #86, S2-113391, Naantali, Finland, Jul. 11-15, 2011.

Notice of Preliminary Rejection issued by the Korean Intellectual Property Office for corresponding Korean Patent Application No. 10-2016-7024907, dated Nov. 9, 2016, with English translation.

(56) References Cited

OTHER PUBLICATIONS

First Notification of Office Action issued by the State Intellectual Property Office of China for corresponding Chinese Patent Application No. 201280066696.7, dated Apr. 13, 2017, with an English translation.
Notice of Preliminary Rejection issued by the Korean Intellectual Property Office for corresponding Korean Patent Application No. 10-2017-7028660, dated Nov. 16, 2017, with English translation.
Second Notification of Office Action issued by the State Intellectual Property Office of China for corresponding Chinese Patent Application No. 201280066696.7, dated Dec. 1, 2017, with an English translation.
Communication pursuant to Article 94(3) EPC issued by the European Patent Office for corresponding European Patent Application No. 12 864 938.1-1214, dated Feb. 14, 2018.
Third Notification of Office Action issued by the State Intellectual Property Office of China for corresponding Chinese Patent Application No. 201280066696.7, dated May 8, 2018, with an English translation.
Office Action issued by the Indian Patent Office for corresponding Indian Patent Application No. 1395/KOLNP/2014, dated Jul. 2, 2018, with English translation.
3GPP TS 36.300 V11.0.0, "Technical Specification 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11)", Dec. 2011.
Summons to attend oral proceedings pursuant to Rule 115(1) EPC issued for corresponding European Application No. 12864938.1, dated Dec. 3, 2018.
Brief Communication issued by the European Patent Office for corresponding European Patent Application No. 12864938.1, dated May 2, 2019.
Communication concerning oral proceedings on May 7, 2019 issued by the European Patent Office in corresponding European Application No. 12864938.1, dated May 2, 2019.
Decision to refuse a European Patent Application issued for corresponding European Patent Application No. 12864938.1, dated Jul. 12, 2019.
Office Action/Examination Report issued by Indonesian Patent office for corresponding Indonesian Patent Application No. P00201601637, dated Jul. 30, 2019, with English summary attached.
Notification of Reasons for Refusal issued by the Japan Patent Office for corresponding Japanese Patent Application No. 2018-167330, dated Nov. 26, 2019, with an English translation.
Office Action issued by the Brazilian Patent Office for corresponding Brazilian Application No. BR112014016969-1, dated Apr. 22, 2020, with English translation.
Extended European search report with the European search report or the partial European search report/ declaration of no search and the European search opinion issued by the European Patent Office for corresponding European Patent Application No. 20176873.6, dated Sep. 28, 2020.
Non-Final Office Action issued by the United States Patent and Trademark Office for corresponding U.S. Appl. No. 15/013,434, dated Jul. 5, 2016.
Non-Final Office Action issued by the United States Patent and Trademark Office for corresponding U.S. Appl. No. 15/013,434, dated Nov. 30, 2016.
Final Office Action issued by the United States Patent and Trademark Office for corresponding U.S. Appl. No. 15/013,434, dated Mar. 10, 2017.
Non-Final Office Action issued by the United States Patent and Trademark Office for corresponding U.S. Appl. No. 15/013,434, dated Oct. 3, 2017.
Final Office Action issued by the United States Patent and Trademark Office for corresponding U.S. Appl. No. 15/013,434, dated Feb. 2, 2018.
Non-Final Office Action issued by the United States Patent and Trademark Office for corresponding U.S. Appl. No. 15/013,434, dated Sep. 21, 2018.
Non-Final Office Action issued by the United States Patent and Trademark Office for corresponding U.S. Appl. No. 16/419,626, dated May 1, 2020.
Non-Final Office Action issued by the United States Patent and Trademark Office for corresponding U.S. Appl. No. 16/419,626, dated Sep. 19, 2019.
Notice of Allowance issued by the United States Patent and Trademark Office for corresponding U.S. Appl. No. 16/419,626, dated Aug. 11, 2020.

\* cited by examiner

RADIO TERMINAL, RADIO COMMUNICATION SYSTEM, AND RADIO COMMUNICATION METHOD

CROSS-REFERENCE TO RELATED APPLICATION

This application is a continuation application of U.S. application Ser. No. 16/419,626, filed May 22, 2019, which is a continuation application of U.S. application Ser. No. 15/013,434, filed Feb. 2, 2016, now U.S. Pat. No. 10,349,292, which is a continuation application of U.S. application Ser. No. 14/322,434, filed Jul. 2, 2014, now U.S. Pat. No. 9,301,187, which is a continuation application of International Application PCT/JP2012/050540 filed on Jan. 13, 2012 which designated the U.S., the entire contents of which are incorporated herein by reference.

FIELD

The embodiments discussed herein relate to a radio terminal that performs radio communication, a radio communication system, and a radio communication method thereof.

BACKGROUND

The cellular mobile communication has evolved from the UMTS (Universal Mobile Telecommunication System) into the LTE (Long Term Evolution). In the LTE, the system based on the OFDM (Orthogonal Frequency Division Multiplexing) is specified as the radio access technology and high-speed radio packet communication with a downlink peak transmission rate of 100 Mb/s or more and an uplink peak transmission rate of 50 Mb/s or more is enabled.

The 3GPP (3rd Generation Partnership Project), which is an international standardization organization, has currently started examinations of the LTE-A (LTE-Advanced) based on the LTE toward realization of higher-speed communication. The LTE-A aims at a downlink peak transmission rate of 1 Gb/s and an uplink peak transmission rate of 500 Mb/s and various new technologies, such as the radio access system and the network architecture, are under study (for example, see 3GPP TR36.913 V9.0.0, 3GPP TR36.912 V9.3.0, and 3GPP TS36.300 V10.4.0). On the other hand, the LTE-A is the system based on the LTE, and therefore, it is important to maintain backward compatibility.

In the LTE or LTE-A, as the operation in the idle mode of a radio terminal, cell selection is specified. Specifically, cell selection and cell reselection are specified (for example, see 3GPP T536.304 V10.2.0 and 3GPP T536.133 V10.3.0).

The cell selection is performed when the radio terminal turns on the power and a PLMN (Public Land Mobile Network: mobile network operator) is selected. As the cell selection, cell selection (initial cell selection) performed by a radio terminal without knowing information of a cell and cell selection (stored information cell selection) performed by a mobile station with knowledge of information of a cell are specified.

In the cell selection, a radio terminal measures radio quality and selects a cell of good radio quality as a serving cell and camps on a network. More specifically, if the cell selection criteria "S" determined by RSRP (Reference Signal Received Power) and RSRQ (Reference Signal Received Quality) are satisfied, it is possible to camp on the cell (for example, see 3GPP TS36.304 V10.2.0). The radio terminal may receive an incoming call by camping on the network. The cell reselection is performed in order to detect a cell of better radio quality and when better radio quality is detected, the radio terminal camps on the cell.

Radio measurement in the idle mode is specified in order to detect a cell of better radio quality (for example, see 3GPP TS36.133 V10.3.0). In the idle mode, it is needed to achieve a balance between power consumption of the radio terminal and accuracy of radio measurement.

For example, if the frequency of measurement is reduced in order to suppress power consumption, the accuracy of measurement deteriorates and there occurs a case where it is not possible to camp on an appropriate cell. On the other hand, if the frequency of measurement is increased in order to improve the accuracy of measurement, power consumption increases. In view of this point, DRX (Discontinuous Reception) is specified (for example, see 3GPP TS36.133 V10.3.0).

There are cases where a DRX cycle value of the DRX is acquired by broadcast information broadcasted by the base station and where it is set by the NAS (Non Access Stratum), which is an upper layer. The radio terminal performs measurement at least once for each DRX and samples the radio quality. The radio terminal then averages the radio quality according to sampling intervals specified by the function of the DRX and then calculates a measured value of the radio quality.

Further, the radio terminal in the idle mode periodically monitors a paging signal in order to detect an incoming call. In the radio terminal, as in the case of the measurement described above, if the frequency of monitoring of a paging signal is reduced, a communication delay occurs and if the frequency of monitoring of a paging signal is increased, power consumption increases. Therefore, it is specified that monitoring of a paging signal is performed only once within the DRX cycle (for example, see 3GPP TS36.304 V10.2.0).

As described above, it is possible for the radio terminal to perform cell selection and incoming call detection in consideration of power consumption by performing measurement and monitoring of a paging signal within the DRX cycle, which is the cycle of measurement.

It is specified that decision of whether or not to perform measurement and cell selection is performed at least once for each DRX cycle. Further, it is specified that sample values (specifically, values of RSRP and RSRQ) of the radio quality obtained by measurement are filtered and averaged where the sample values are spaced by at least half of the DRX duration when calculating a measured value of measurement (for example, see 3GPP TS36.133 V10.3.0).

Therefore, if the DRX cycle is increased in order to suppress power consumption of the radio terminal, the sampling interval of measurement increases and there has been such a problem that the accuracy of measurement deteriorates.

SUMMARY

According to an aspect of the embodiments, there is provide a radio terminal that performs radio communication with a base station, including: a communication unit configured to perform radio measurement and monitoring of a paging signal of the base station; and a control unit configured to make it possible to control the communication unit so as to configure first duration and second duration, to receive information of the first duration by Non-Access Stratum (NAS) message from the base station, and to perform the radio measurement and the monitoring during the first duration but not to perform the radio measurement and the monitoring during the second duration following the first duration, wherein the control unit is further configured to control the radio measurement and the monitoring by ending the second duration for transmitting uplink data of the radio terminal to a suitable base station, the uplink data being originated during the second duration.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Hereinafter, embodiments are explained in detail with reference to the drawings.

First Embodiment

Figure 1:
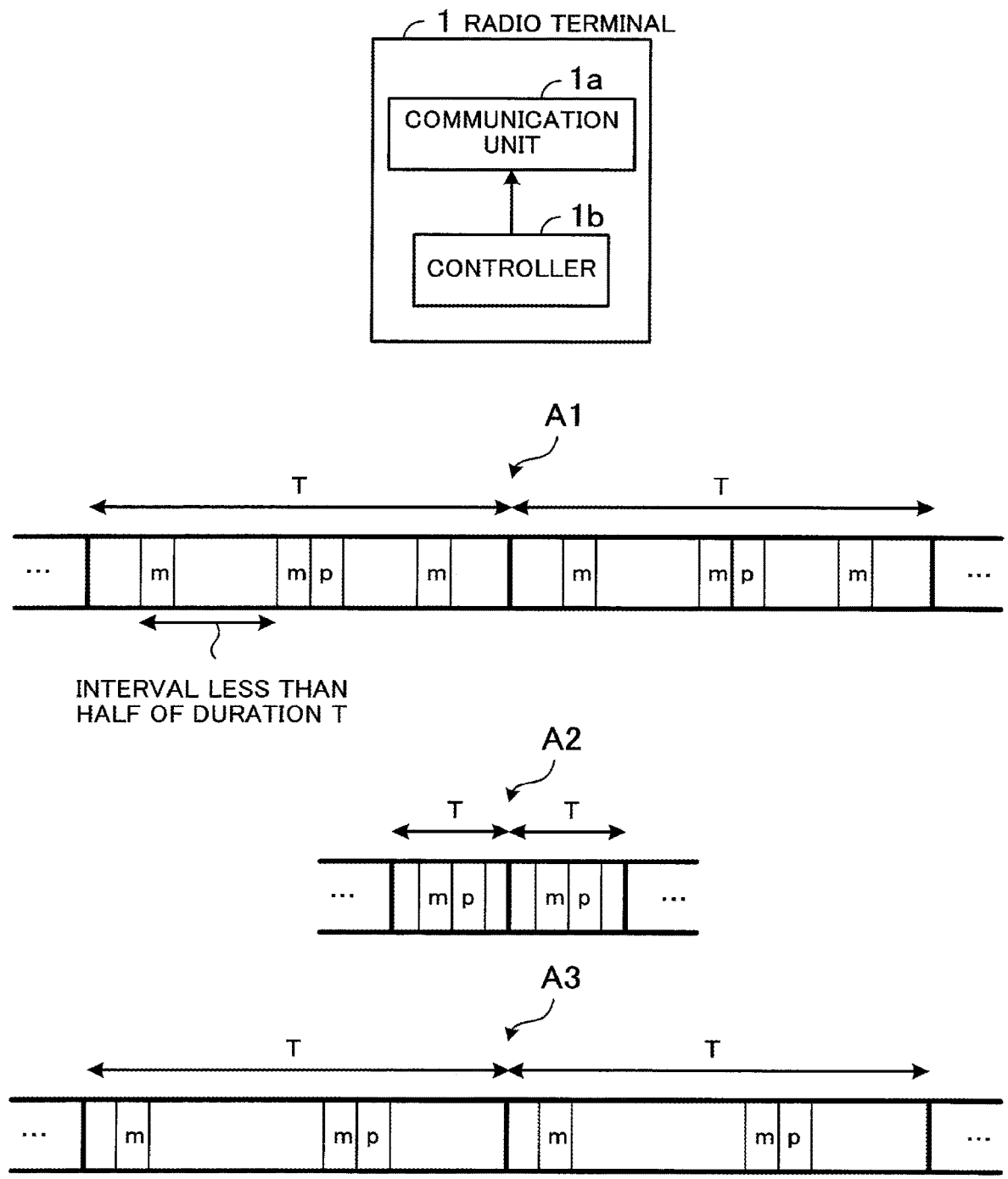
FIG. 1 explains a radio terminal according to a first embodiment.

FIG. 1 explains a radio terminal according to a first embodiment. As illustrated in FIG. 1, a radio terminal 1 has a communication unit 1a and a controller 1b. Arrows A1 to A3 illustrated in FIG. 1 indicate timing of measurement of a base station, not illustrated, and timing of monitoring of a paging signal performed by the radio terminal 1. In FIG. 1, m indicates timing of measurement of a base station, not illustrated, and p indicates timing of monitoring of a paging signal performed by the radio terminal 1.

The communication unit 1a intermittently performs measurement of a base station, not illustrated, and monitoring of a paging signal within the duration of a periodic duration T.

For example, T illustrated in FIG. 1 indicates DRX. The communication unit 1a intermittently performs measurement (m) of a base station and monitoring of a paging signal (p) within a DRX cycle of the DRX.

The controller 1b controls the communication unit 1a so as to perform measurement, within the duration T, with intervals intervals less than half of the duration T. Further, it is also made possible to perform filtering of sample values (specifically, values of RSRP and RSRQ) of radio quality obtained by measurement where the sample values are spaced by less than half of the duration T.

For example, as indicated by the arrow A1, the controller 1b controls the communication unit 1a so as to perform measurement where the sample values are spaced by less than half of the duration T. Specifically, the controller 1b controls the communication unit 1a so as to perform measurement where the sample values are spaced by less than half of the DRX cycle.

The arrow A2 indicates an example of the conventional timing of measurement and monitoring of a paging signal. As described previously, it is specified that decision of whether or not to perform measurement and cell selection is performed at least with intervals of the DRX cycle. Here, in order to suppress the power consumption of the radio terminal 1, the length (DRX cycle) of the duration T is increased as indicated by the arrow A3.

The arrow A3 indicates another example of the conventional timing of measurement and monitoring of a paging signal. Without violating the specification, measurement is performed with intervals of half the DRX cycle (DRX cycle/2). Further, in the calculation of measured values of measurement, sample values of the measurement are averaged and the averaged values are measurement result of the radio quality of each cell. By performing measurement and calculation of measured values, it is possible to maintain the accuracy of measurement even if the length (DRX cycle) of the duration T increases. However, the conventional interval of measurement increases as the DRX cycle increases, and therefore, the averaging interval of measurement increases and the accuracy of measurement deteriorates.

In contrast to this, as described above, the controller 1b controls the communication unit 1a so as to perform measurement with intervals less than half of the length of the duration T. Further, also in the filtering of sample values (specifically, values of RSRP and RSRQ) of the radio quality obtained by measurement, it is made possible to perform filtering where the sample values are spaced by less than half of the length. Due to this, the radio terminal 1 may shorten the averaging interval of measurement as well as suppressing power consumption, and may suppress deterioration in measurement.

As described above, the communication unit 1a of the radio terminal 1 performs measurement of the base station and monitoring of a paging signal within the duration of the periodic duration T. Then, the controller 1b controls the communication unit 1a so as to perform measurement with intervals less than half of the length of the duration T within the duration T. Due to this, the radio terminal 1 may prevent the interval of measurement from increasing and may suppress deterioration in measurement even if the length of the duration T is increased in order to suppress power consumption.

Second Embodiment

Next, a second embodiment is explained in detail with reference to drawings.

Figure 2:
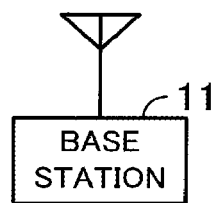
FIG. 2 illustrates a radio communication system according to a second embodiment.
Figure 2:
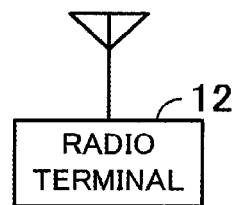

FIG. 2 illustrates a radio communication system according to the second embodiment. FIG. 2 illustrates a base station 11 and a radio terminal 12. The base station 11 and the radio terminal 12 perform radio communication by the LTE-A or LTE communication system.

The radio terminal 12 is built in a device, such as a gas meter and an electricity meter. The radio terminal 12 transmits information such as an anomaly and a usage fee detected by the device, for example, a gas meter and an electricity meter, to the base station 11. The information transmitted to the base station 11 is transmitted to, for example, a gas company or an electricity company.

The device as described above has communication characteristics different from those of a mobile telephone etc. For example, the device does not move and the amount of communication is small. Consequently, it is thought that the device is in the idle mode in most of time and rarely enters the connected mode.

In the case where the device is installed in a condominium etc., the base station 11 may be, for example, a home eNB (evolved Node B). Further, the device may be built in a sensor or a health meter for managing human health condition, not limited to the above-described meter.

Figure 3:
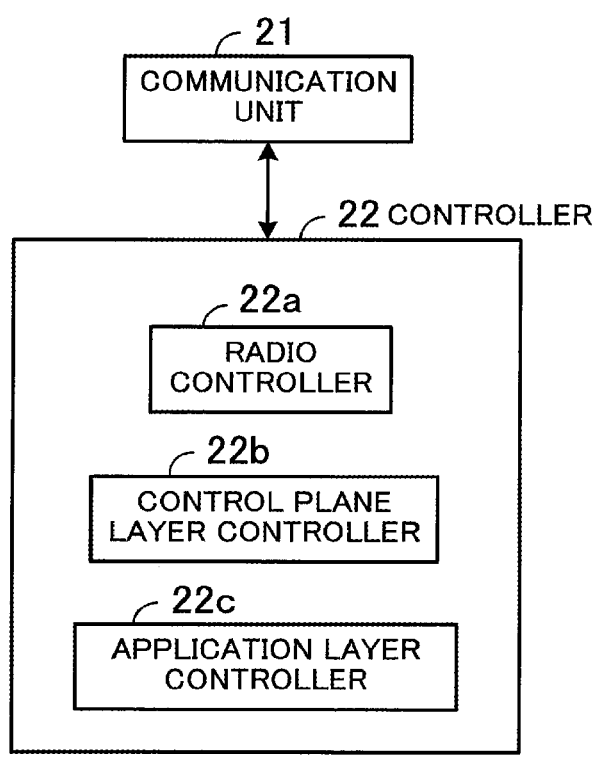
FIG. 3 is a function block diagram of a radio terminal.

FIG. 3 is a function block diagram of a radio terminal. As illustrated in FIG. 3, the radio terminal 12 has a communication unit 21 and a controller 22. The controller 22 has a radio controller 22a, a control plane layer controller 22b, and an application layer controller 22c.

The communication unit 21 performs control of radio communication. For example, the communication unit 21 performs base band (BB) processing and radio frequency (RF) processing of a signal transmitted to and received from the base station 11. Further, the power of the communication unit 21 is turned on and off by the control of the radio controller 22a of the controller 22.

The radio controller 22a controls the BB processing and the RF processing of the communication unit 21. Further, the radio controller 22a performs turning on and off control of the power of the communication unit 21.

The control plane layer controller 22b performs control of an RRC (Radio Resource Control) layer and an NAS layer.

The application layer controller 22c performs control of an application layer.

The communication unit 21 corresponds to, for example, the communication unit 1a in FIG. 1. The radio controller 22a and the control plane layer controller 22b correspond to, for example, the controller 1b in FIG. 1.

Figure 4:
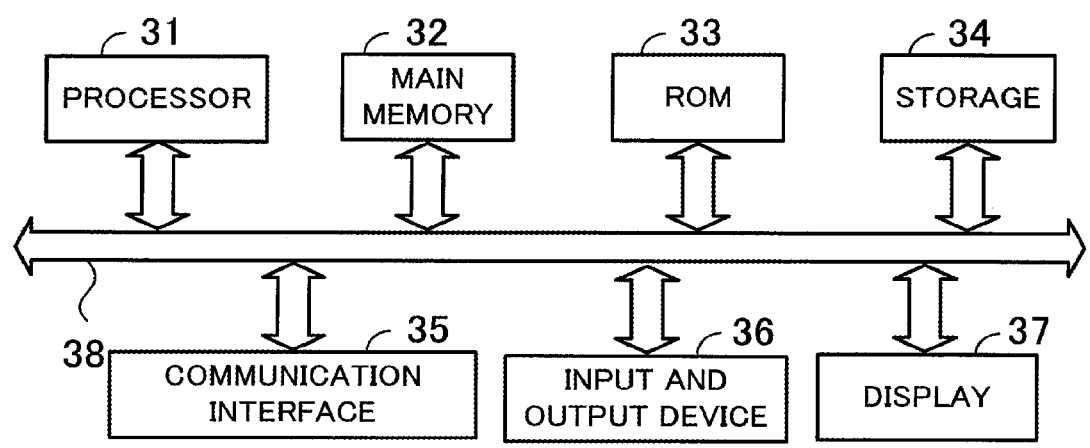
FIG. 4 illustrates a hardware configuration example of a radio terminal.

FIG. 4 illustrates a hardware configuration example of a radio terminal. As illustrated in FIG. 4, the radio terminal has a processor 31, a main memory 32, a ROM (Read Only Memory) 33, a storage 34, a communication interface 35, an input and output device 36, a display 37, and a bus 38.

To the processor 31, the maim memory 32, the ROM 33, the storage 34, the communication interface 35, the input and output device 36, and the display 37 are connected via the bus 38. The whole of the radio terminal 12 is controlled by the processor 31. The processor 31 is, for example, a CPU (Central Processing Unit) or a DSP (Digital Signal Processor).

In the main memory 32, data and programs used in various kinds of processing of the processor 31 are temporarily stored. In the ROM 33, static information, such as a protocol to specify the operation of the radio terminal 12, is stored. For example, in the ROM 33, information for the processor 31 to perform data plane processing, control plane processing, scheduling processing, or the like is stored. In the storage 34, data and programs used in various kinds of processing of the processor 31 are stored. The communication interface 35 performs radio communication with the base station 11. For example, the communication interface 35 converts a base band signal into a radio frequency and outputs the radio frequency to an antenna, not illustrated. Further, the communication interface 35 frequency-converts a radio signal received by an antenna, not illustrated, into a base band signal.

The input and output device 36 is, for example, a key, a speaker, or a microphone. For example, the key receives a character or a numeral input by a user. The speaker, for example, converts a voice signal received from the base station 11 into voice and outputs the voice. The microphone converts voice of a user into an electric signal. The display 37 is, for example, an LCD (Liquid Crystal Display). The display 37 displays, for example, data received from the base station 11.

The function of the communication unit 21 in FIG. 3 is implemented by, for example, the communication interface 35. The function of the controller 22 is implemented by, for example, the processor 31.

Figure 5:
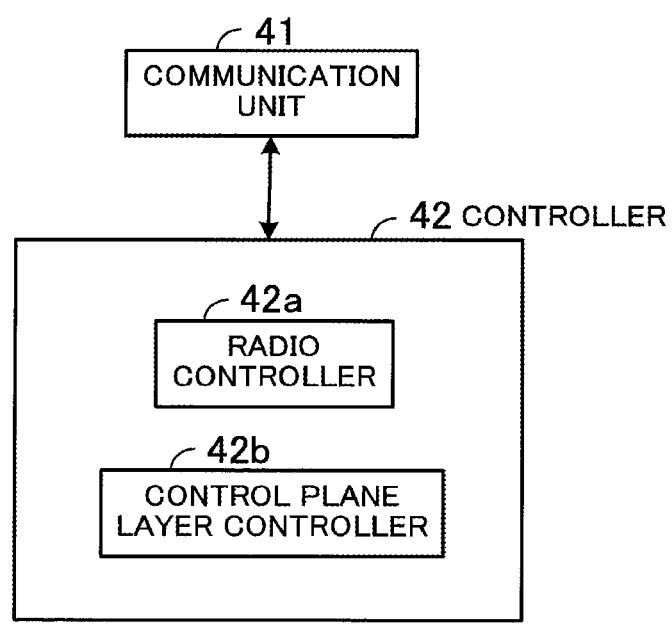
FIG. 5 is a function block diagram of a base station.

FIG. 5 is a function block diagram of a base station. As illustrated in FIG. 5, the base station 11 has a communication unit 41 and a controller 42. The controller 42 has a radio controller 42a and a control plane layer controller 42b.

The communication unit 41 performs control of radio communication. For example, the communication unit 41 performs BB processing and RF processing of a signal transmitted to and received from the radio terminal 12.

The radio controller 42a controls BB processing and RF processing of the communication unit 41.

The control plane layer controller 42b performs control of the RRC layer and the NAS layer.

Figure 6:
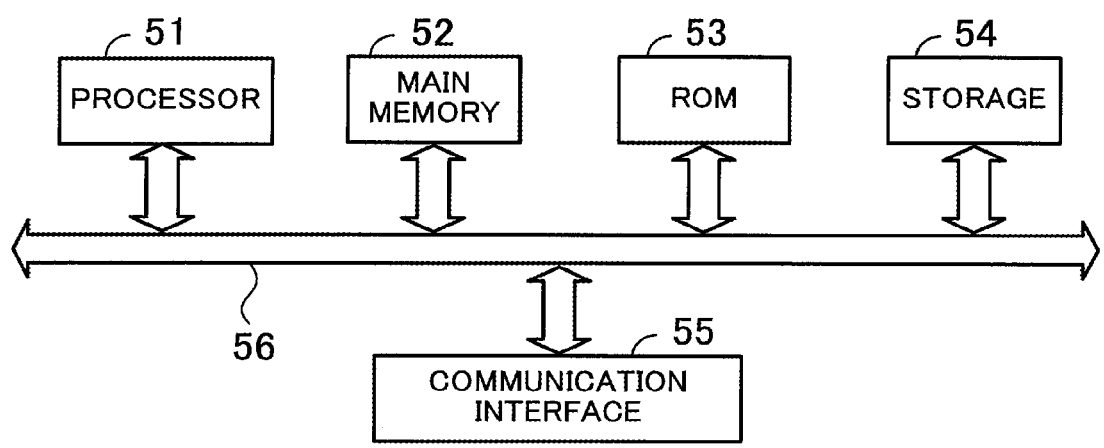
FIG. 6 illustrates a hardware configuration example of a base station.

FIG. 6 illustrates a hardware configuration example of a base station. As illustrated in FIG. 6, the base station 11 has a processor 51, a main memory 52, a ROM 53, a storage 54, a communication interface 55, and a bus 56.

To the processor 51, the main memory 52, the ROM 53, the storage 54, and the communication interface 55 are connected via the bus 56. The whole of the base station 11 is controlled by the processor 51. The processor 51 is, for example, a CPU or a DSP.

In the main memory 52, data and programs used in various kinds of processing of the processor 51 are temporarily stored. In the ROM 53, static information, such as a protocol to specify the operation of the base station 11, is stored. For example, in the ROM 53, information for the processor 51 to perform data plane processing, control plane processing, scheduling processing, or the like is stored. In the storage 54, data and programs used in various kinds of processing of the processor 51 are stored. The communication interface 55 performs radio communication with the radio terminal 12. For example, the communication interface 55 converts a base band signal into a radio frequency and outputs the radio frequency to an antenna, not illustrated. Further, the communication interface 55 frequency-converts a radio signal received by an antenna, not illustrated, into a base band signal. Furthermore, the communication interface 55 performs wired communication with a high-level apparatus, such as an S-GW (Serving-Gateway).

Figure 7:
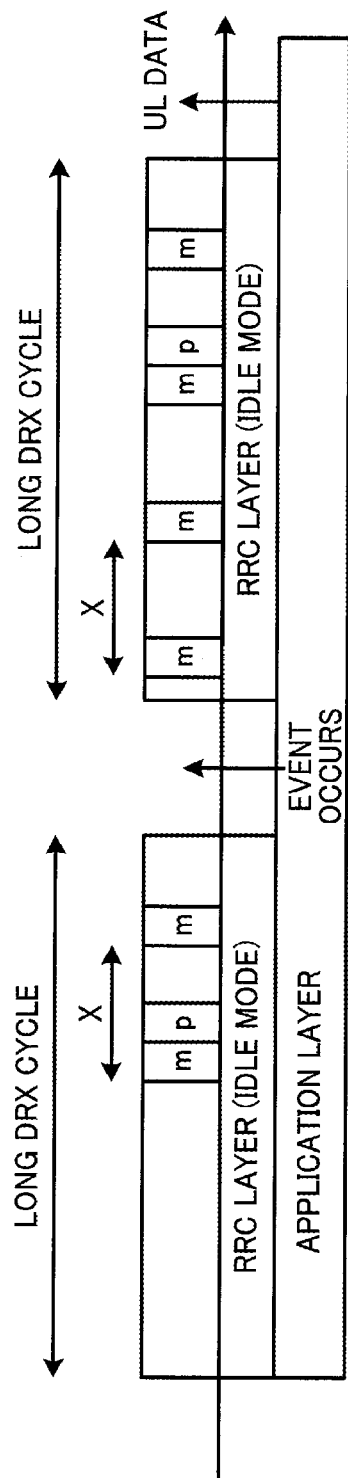
FIG. 7 is part 1 of a timing chart of a radio terminal.

FIG. 7 is part 1 of a timing chart of a radio terminal. In FIG. 7, m indicates timing of measurement of the radio terminal 12. Further, p indicates timing of monitoring of a paging signal of the radio terminal 12.

In the example in FIG. 7, the timings of m and p are different between before and after an event detected by the application layer. An event occurs by, for example, a charge report of an electricity meter or the like and an anomaly report.

The radio terminal 12 uses a long DRX cycle longer than the normal DRX cycle in order to, for example, reduce power consumption.

Here, the measured value of the conventional measurement is calculated by averaging samples of measurement having at least an interval of "DRX cycle/2". Therefore, the interval of measurement increases, for example, as indicated by the arrow A3 in FIG. 1 and the measurement accuracy of measurement deteriorates.

In contrast to this, in the radio terminal 12, measurement is performed at least once within the DRX duration as conventionally. Consequently, it is possible to perform measurement a plurality of times within the DRX duration. However, a measured value is calculated by filtering a sample value of measurement wherein the sample values are spaced by 'long DRX cycle/n' (n>2). Consequently, the radio terminal 12 performs measurement with intervals of 'X' illustrated in FIG. 7.

The radio terminal 12 calculates a measured value of measurement by, for example, averaging two measurements. For example, the radio terminal 12 calculates a measured value using sample values of two measurements of m on the left side and of m on the right side in the long DRX cycle before an event occurs illustrated in FIG. 7. Further, the radio terminal 12 calculates a measured value using sample values of measurements of the first m and the second m from the left in the long DRX cycle after the occurrence of the event. Further, the radio terminal calculates a measured value using sample values of measurements of the third m and the fourth m from the left.

After the occurrence of the event, the number of times of measurement within the long DRX cycle has increased compared to that before the occurrence of the event. For example, in FIG. 7, before the occurrence of the event, the number of times of measurement is two, but after the occurrence of the event, the number of times is four. The reason for this is that camping on an appropriate cell and appropriate notification of event information to the base station are enabled by increasing the number of times of measurement to improve the accuracy of evaluation of measurement. When determining that it is not possible to connect to the previous cell by the measurement after the occurrence of the event, the radio terminal 12 performs cell selection to attempt detection of a new cell. Further, after transmitting UL data for the event, the radio terminal 12 returns to the operation before the occurrence of the event.

Figure 8:
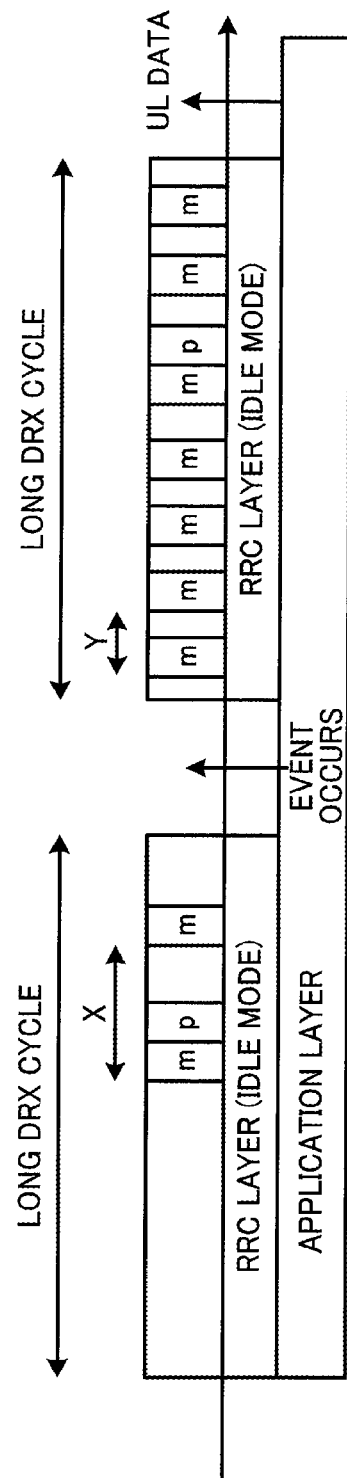
FIG. 8 is part 2 of the timing chart of the radio terminal.

FIG. 8 is part 2 of the timing chart of the radio terminal. In the timing chart in FIG. 8, the interval of measurement after the occurrence of an event is short, i.e., an interval Y, with respect to the timing chart in FIG. 7. In other words, in FIG. 8, the frequency of measurement is increased compared to that in FIG. 7. Due to this, the power consumption of the radio terminal 12 increases compared to that in FIG. 7, but the accuracy of measurement improves because the interval at which each sample is averaged is shortened in calculation of a measured value of measurement.

However, this does not mean that the shorter the averaging interval, the better the measurement accuracy in calculation of a measured value of measurement. If the averaging interval is too short, there is a possibility that an evaluation is made only in the instant of excellent radio propagation condition or conversely, a possibility that an evaluation is made only in the instant of poor radio propagation condition. Therefore, it is recommended to set the interval between each sample with keeping some interval. For example, in FIG. 7, the interval of filtering of measurement is set to 'X/2' and in FIG. 8, the interval of filtering of measurement is set to 'Y/2'.

Note that, the radio terminal 12 may resume the usual measurement interval after the occurrence of the event. For example, the radio terminal 12 may perform measurement with intervals of 'DRX cycle/2' after the occurrence of the event.

Acquisition of n that determines the interval of measurement is explained. For example, n is notified from the base station 11 by broadcast information.

Specifically, after the power is turned on, the radio terminal 12 makes an initial cell search and camps on a cell of good radio quality (suitable cell). At this time, the radio terminal 12 performs an NAS Attach procedure. When camping on a cell, the radio terminal 12 acquires the broadcast information of the cell from the base station 11 and acquires n from the acquired broadcast information. Due to this, the radio terminal 12 may calculate the interval of measurement.

As illustrated in FIG. 8, when the interval of measurement is changed between before and after the occurrence of the event, the radio terminal 12 may notify the base station 11 that an event has occurred and the base station 11 may notify the radio terminal 12 of new n. The base station 11 may also change n in accordance with, for example, the type of the event (e.g., whether or not the event is an emergency event).

Further, n may be determined in advance or may be calculated from the device ID. For example, the device ID is indicated by a value of 12 bits. The radio terminal 12 may divide the device ID of the radio terminal 12 by, for example, an appropriate value, such as 4,000, and may set the remainder to n.

The base station 11 may also notify the radio terminal of the number of times of measurement within the long DRX cycle by broadcast information. Further, the base station 11 may notify the number of times of measurement within the long DRX cycle when receiving event notification from the radio terminal 12.

Figure 9:
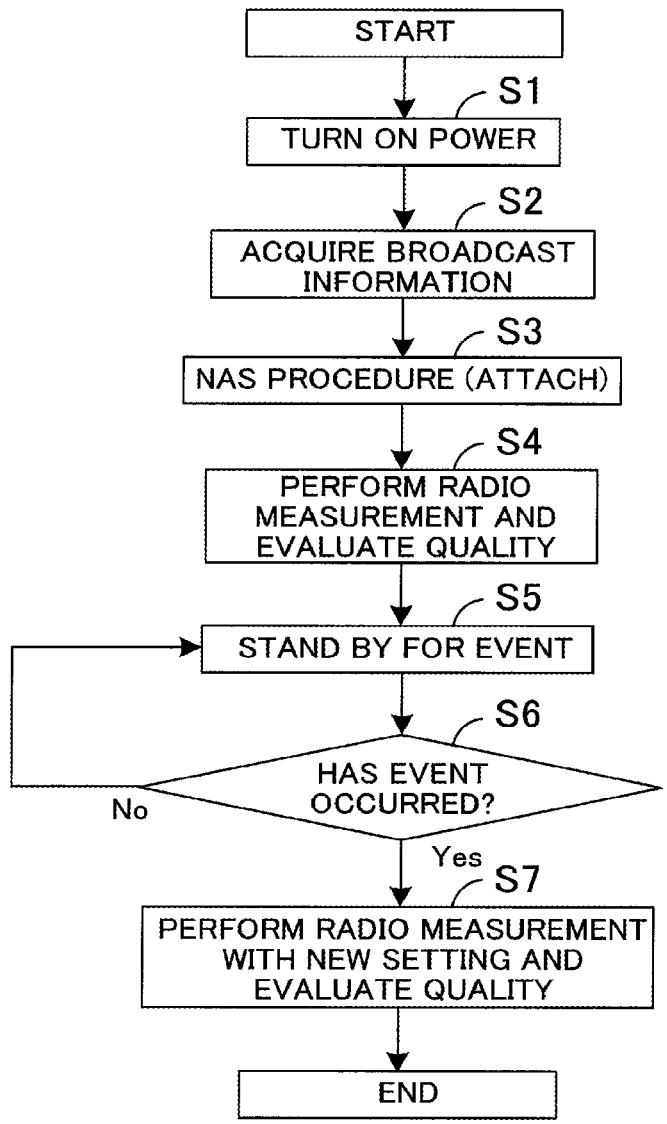
FIG. 9 is a flowchart of a radio terminal.

FIG. 9 is a flowchart of a radio terminal.

(Step S1) The power of the radio terminal 12 is turned on.

(Step S2) The control plane layer controller 22b receives broadcast information from the base station 11. In other words, the control plane layer controller 22b receives 'n' which is used to calculate the interval of measurement.

(Step S3) The control plane layer controller 22b performs the NAS Attach procedure.

(Step S4) The control plane layer controller 22b calculates the interval of measurement from the received 'n'. The radio controller 22a turns on and off the communication unit 21 so as to perform measurement with intervals calculated by the control plane layer controller 22b. The control plane layer controller 22b averages the measured measurements to evaluate the quality thereof.

The control plane layer controller 22b performs monitoring of paging with, for example, timing that satisfies the following expression.

$$\text{SFN mod } T = (T \text{ div } N)*(\text{UE-ID mod } N)$$

SFN is a system frame number. T is a DRX cycle (long DRX cycle). UE-ID is an ID of the radio terminal. N is a value determined by the DRX cycle.

(Step S5) The application layer controller 22c stands by for an event.

(Step S6) The application layer controller 22c determines whether or not an event has occurred. In the case where an event has occurred, the application layer controller 22c proceeds to step S7. In the case where no event has occurred, the application layer controller 22c proceeds to step S5.

(Step S7) The control plane layer controller 22b and the radio controller 22a perform measurement with new settings and make an evaluation of the quality thereof. For example, the control plane layer controller 22b performs measurement with new settings as explained in FIG. 8. The control plane layer controller 22b may perform measurement as illustrated in FIG. 7.

Figure 10:
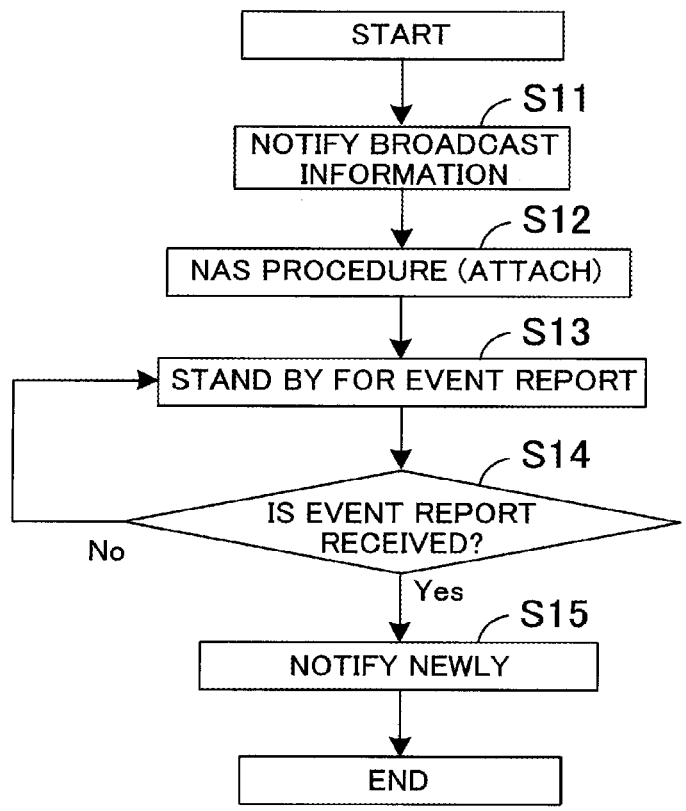
FIG. 10 is a flowchart of a base station.

FIG. 10 is a flowchart of a base station.

(Step S11) The control plane layer controller 42b notifies the radio terminal 12 of broadcast information via the radio controller 42a. The broadcast information includes 'n' which is used to calculate the interval of measurement.

(Step S12) The control plane layer controller 42b performs the NAS Attach procedure.

(Step S13) The control plane layer controller 42b stands by for an event report from the radio terminal 12.

(Step S14) The control plane layer controller 42b determines whether or not the event report from the radio terminal 12 is received. In the case where the event report from the radio terminal 12 is received, the control plane layer controller 42b proceeds to step S15. In the case where the event report from the radio terminal 12 is not received, the control plane layer controller 42b proceeds to step S13.

(Step S15) The control plane layer controller 42b notifies the radio terminal 12 of new 'n'.

As described above, the control plane layer controller 22b and the radio controller 22a control the communication unit so as to perform filtering of measurement, within the long DRX cycle, with intervals less than half of the length of the long DRX cycle. Due to this, the radio terminal 12 may suppress an increase in the interval of measurement and may suppress deterioration in the accuracy of measurement even if the long DRX cycle is adopted in order to suppress power consumption.

Further, the control plane layer controller 22b and the radio controller 22a, after the occurrence of the event, increase the number of times of measurement within the long DRX cycle compared to that before the event. Due to this, the radio terminal 12 may improve the quality of measurement.

Further, the control plane layer controller 22b and the radio controller 22a, after the occurrence of the event, reduce the interval of measurement compared to that before the event. Due to this, the radio terminal 12 may improve the quality of measurement Third Embodiment Next, a third embodiment is explained in detail with reference to drawings. In the third embodiment, masking is performed on the conventional DRX to provide a duration in which the DRX is not performed and the DRX is performed periodically. Although the conventional DRX may be performed in the duration in which the DRX is performed, in order to improve the quality of measurement, it may also be possible to perform measurement a plurality of times within the DRX cycle and to perform filtering of measurement with intervals less than half of the length of the DRX cycle.

Note that, the radio communication system according to the third embodiment is the same as that in FIG. 2. The block of the radio terminal 12 is the same as that in FIG. 3, but the function of the control plane layer controller 22b is different. The hardware configuration of the radio terminal 12 is the same as that in FIG. 4. The block of the base station 11 is the same as that in FIG. 5, but the function of the control plane layer controller 42b is different. The hardware configuration of the base station 11 is the same as that in FIG. 6.

Figure 11:
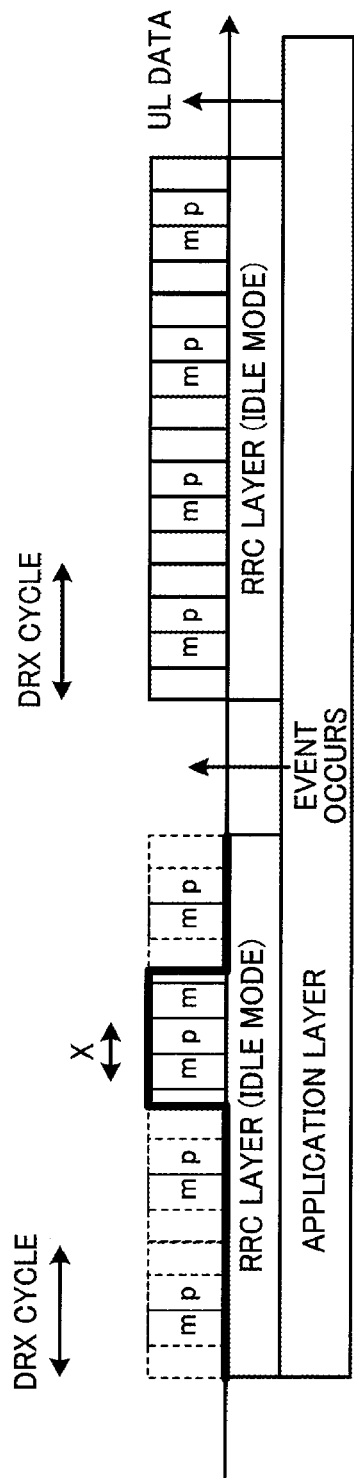
FIG. 11 is a timing chart of a radio terminal according to a third embodiment.

FIG. 11 is a timing chart of a radio terminal according to the third embodiment. In FIG. 11, the long DRX cycle in FIG. 7 is replaced with the DRX cycle. Other portions in FIG. 11 are the same as those in FIG. 7, and therefore, explanation thereof is omitted.

The radio terminal 12 acts so that, before an event occurs, the DRX cycle is masked in which measurement is not performed and the DRX is performed periodically (thick line in FIG. 11). The radio terminal 12 performs measurement and monitoring of a paging signal within the DRX cycle not masked.

In the section not masked, the radio terminal 12 performs measurement at intervals of 'DRX cycle/n' (n>2) as illustrated in FIG. 11. Consequently, the radio terminal 12 performs filtering of measurement at intervals of 'X' illustrated in FIG. 11.

After the occurrence of the event, the radio terminal does not mask the DRX cycle. In other words, the radio terminal 12 performs measurement and monitoring of a paging signal in each DRX cycle as illustrated in FIG. 11.

Figure 12:
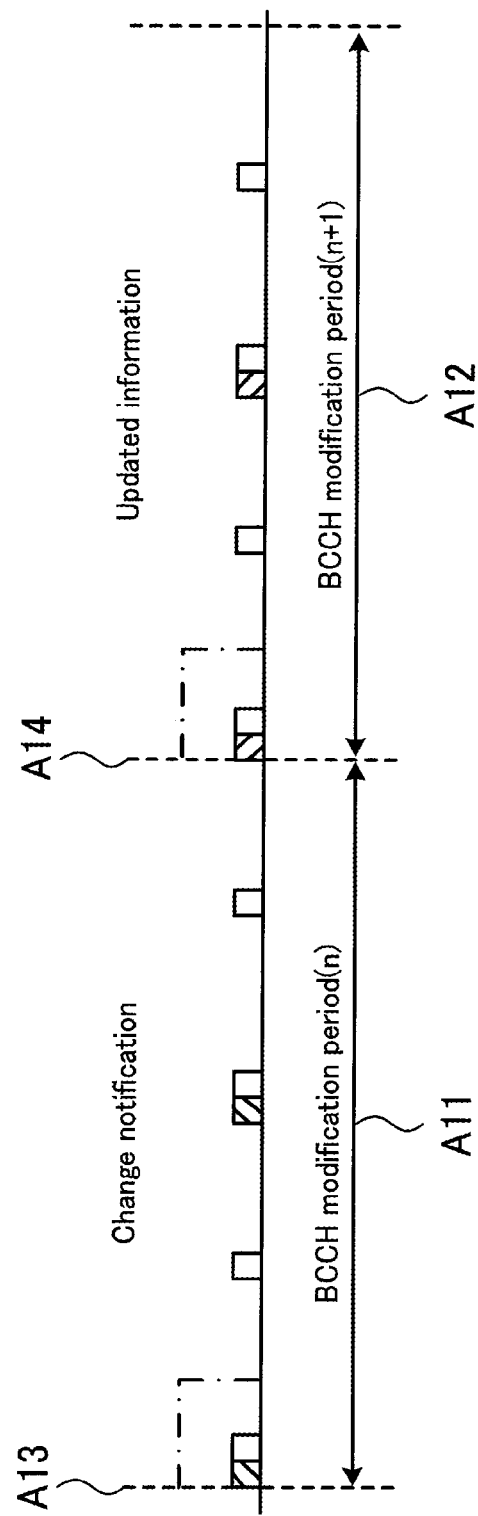
FIG. 12 explains a mask pattern of DRX.

FIG. 12 explains a mask pattern of the DRX. The control plane layer controller 22b of the radio terminal 12 releases the mask of the DRX in synchronization with the BCCH (Broadcasting Control Channel) modification period, which is the period to check a change of the broadcast information.

Double-headed arrows A11, A12 illustrated in FIG. 12 indicate the BCCH modification period. The control plane layer controller 22b releases the mask of the DRX with timing of dotted lines A13, A14 illustrated in FIG. 12. For example, the control plane layer controller 22b controls the radio controller 22a so as to turn on the communication unit 21 (so as to perform DRX) with the timing of the dotted lines A13, A14.

The alternate long and short dash line illustrated in FIG. 12 indicates the period of time during which the mask of the DRX cycle is released (period of time during which DRX is performed). The rectangle and the rectangle with slashes illustrated in FIG. 12 indicate the broadcast information (SIB: System Information Block) notified to the radio terminal 12 from the base station 11.

The control plane layer controller 22b monitors SIB1 (rectangle with slashes rising toward the right in FIG. 12) or a paging signal to check whether or not there is a change in the broadcast information. The control plane layer controller 22b turns on the communication unit 21 to monitor the SIB1 and paging signal. The control plane layer controller 22b performs measurement and monitoring of a paging signal by utilizing this timing. The rectangle with slashes falling toward the right indicates the SIB whose information has been changed.

The period of time during which the mask is released may be notified by, for example, broadcast information, or may be determined in advance. Further, the period of time may be calculated from the device ID of the radio terminal 12. Furthermore, the radio terminal 12 may freely release the mask by implementation thereof.

In the above, it is described that the mask pattern synchronizes with the BCCH modification period, and now a setting example of another mask pattern is explained.

Example 1: The base station 11 broadcasts a masking pattern by broadcast information. For example, the base station broadcasts within which DRX cycle to perform the DRX by broadcast information. The control plane layer controller 22b of the radio terminal 12 releases the mask within the DRX cycle included in the received broadcast information and performs measurement and monitoring of a paging signal. The period of time during which the mask is released may be broadcasted by, for example, broadcast information, or may be determined in advance. Further, the period of time may be calculated from the device ID of the radio terminal 12.

Example 2: A masking pattern is notified by a paging signal. For example, when the radio terminal 12 camps on, the base station 11 notifies a masking pattern of the DRX by a paging signal.

Example 3: When the radio terminal 12 camps on, the location is registered in an MME (Mobility Management Entity). The location registration is performed in the NAS layer and the NAS Attach procedure is performed. The radio terminal 12 receives a masking pattern by an NAS Attach Accept of an NAS message transmitted and received by the NAS Attach procedure.

Example 4: Each time the DRX is masked N times, the masking of the DRX is released. N may be notified by broadcast information from the base station 11 or may be determined in advance by the base station 11 and the radio terminal 12. Further, N may be calculated from the device ID of the radio terminal 12.

Example 5: Based on an IMSI (International Mobile Subscriber Identity), which is an identifier of a radio terminal, a radio frame in which the mask of the DRX is released is determined. For example, the mask of the DRX is released in the radio frame in which the SFN mod DRX cycle and func (IMSI) become equal to each other. The func ( ) is an appropriate function and for example, a function that outputs a value by the IMSI.

Figure 13:
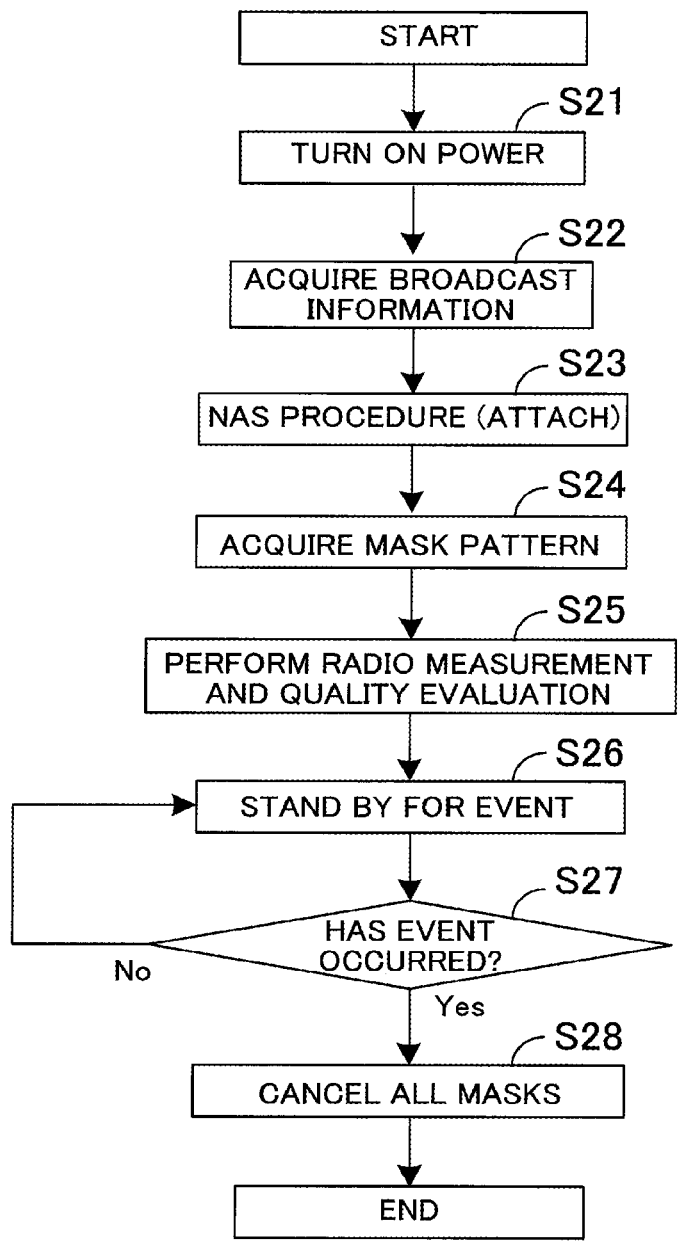
FIG. 13 is a flowchart of a radio terminal.

FIG. 13 is a flowchart of a radio terminal.

(Step S21) The power of the radio terminal 12 is turned on.

(Step S22) The control plane layer controller 22b receives broadcast information from the base station 11.

(Step S23) The control plane layer controller 22b performs the NAS Attach procedure.

(Step S24) The control plane layer controller 22b receives a mask pattern of the DRX by performing the NAS Attach procedure. The flowchart in FIG. 13 illustrates a processing example in the case of Example 3 described above.

(Step S25) The control plane layer controller 22b controls the radio controller 22a so as to perform the DRX with the received mask pattern. The radio controller 22a turns on and off the communication unit 21 in accordance with the control of the control plane layer controller 22b so that measurement and monitoring of a paging signal are performed. The control plane layer controller 22b averages measured measurements to evaluate the quality thereof.

(Step S26) The application layer controller 22c stands by for an event.

(Step S27) The application layer controller 22c determines whether or not the event has occurred. In the case where the event has occurred, the application layer controller 22c proceeds to step S28. In the case where no event has occurred, the application layer controller 22c proceeds to step S26.

(Step S28) The control plane layer controller 22b releases all the masks. For example, the control plane layer controller 22b controls the radio controller 22a so that measurement and monitoring of a paging signal are performed in each DRX cycle as illustrated after the occurrence of the event in FIG. 11.

Figure 14:
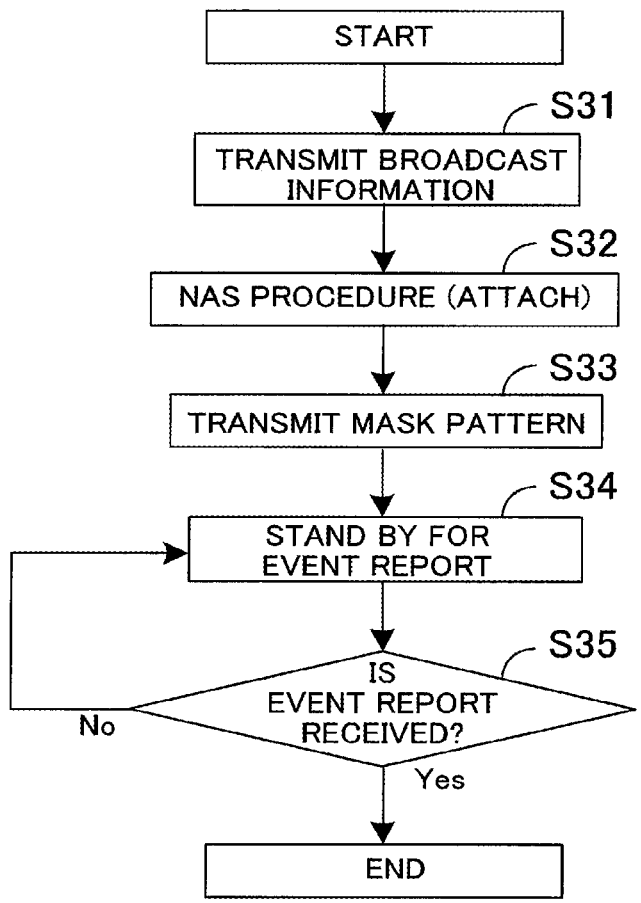
FIG. 14 is a flowchart of a base station.

FIG. 14 is a flowchart of a base station.

(Step S31) The control plane layer controller 42b notifies the radio terminal 12 of broadcast information via the radio controller 42a.

(Step S32) The control plane layer controller 42b performs the NAS Attach procedure.

(Step S33) The control plane layer controller 42b transmits a mask pattern of the DRX by the NAS Attach procedure. The flowchart in FIG. 14 illustrates a processing example in the case of Example 3 described above.

(Step S34) The control plane layer controller 42b stands by for an event report from the radio terminal 12.

(Step S35) The control plane layer controller 42b determines whether or not the event report from the radio terminal 12 is received. In the case where the event report from the radio terminal 12 is received, the control plane layer controller 42b ends the processing. In the case where the event report from the radio terminal 12 is not received, the control plane layer controller 42b proceeds to step S34.

As described above, the control plane layer controller 42b acts so that a duration during which the DRX is not performed is set and the DRX is performed periodically. Then, the control plane layer controller 42b and the radio controller 42a perform filtering of measurement at intervals less than half the cycle length of the DRX cycle within the DRX cycle of the DRX performed periodically. Due to this, the radio terminal 12 may suppress an increase in the interval of measurement and may suppress deterioration in measurement within the DRX cycle of the DRX performed periodically in order to suppress power consumption.

Fourth Embodiment

Next, a fourth embodiment is explained in detail with reference to drawings. In the fourth embodiment, the base station specifies the DRX to be performed next.

The radio communication system according to the fourth embodiment is the same as that in FIG. 2. The block of the radio terminal 12 is the same as that in FIG. 3, but the function of the control plane layer controller 22b is different. The hardware configuration of the radio terminal 12 is the same as that in FIG. 4. The block of the base station 11 is the same as that in FIG. 5, but the function of the control plane layer controller 42b is different. The hardware configuration of the base station 11 is the same as that in FIG. 6.

Figure 15:
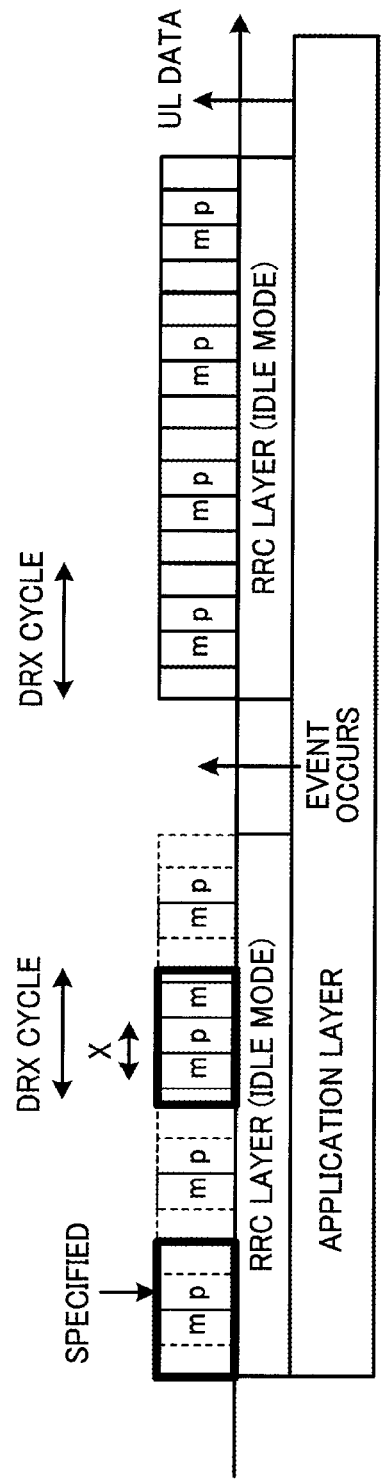
FIG. 15 is a timing chart of a radio terminal according to a fourth embodiment.

FIG. 15 is a timing chart of a radio terminal according to the fourth embodiment. In FIG. 15, the DRX to be performed next is specified by a paging signal, which is different from FIG. 11. Other portions in FIG. 15 are the same as those in FIG. 11, and therefore, explanation thereof is omitted.

When camping on a cell of the base station 11, the control plane layer controller 22b of the radio terminal 12 performs measurement and monitoring of a paging signal. The base station 11 specifies within which DRX the radio terminal 12 next performs measurement and monitoring of a paging signal by a paging signal. The control plane layer controller 22b performs measurement and monitoring of a paging signal within the specified DRX.

The period of time during which the DRX is performed may be specified by the paging signal or notified by broadcast information. Further, the period of time may be determined in advance or may be calculated from the device ID of the radio terminal 12. Furthermore, the period of time may be determined by implementation of the radio terminal. For example, the base station 11 specifies the start of the DRX by broadcast information and the period of time of the DRX is determined by implementation of the radio terminal 12.

The base station 11 may specify to perform the DRX by the NAS. For example, when the radio terminal 12 camps on, the location is registered in the MME. The location registration is performed in the NAS layer and the NAS Attach procedure is performed. The base station 11 specifies the DRX to be performed next by the NAS Attach Accept of the NAS message transmitted and received by the NAS Attach procedure. The period of time during which the DRX is performed may be notified by the NAS Attach Accept or notified by broadcast information. Further, the period of time may be determined in advance or may be determined by the device ID of the radio terminal 12.

Figure 16:
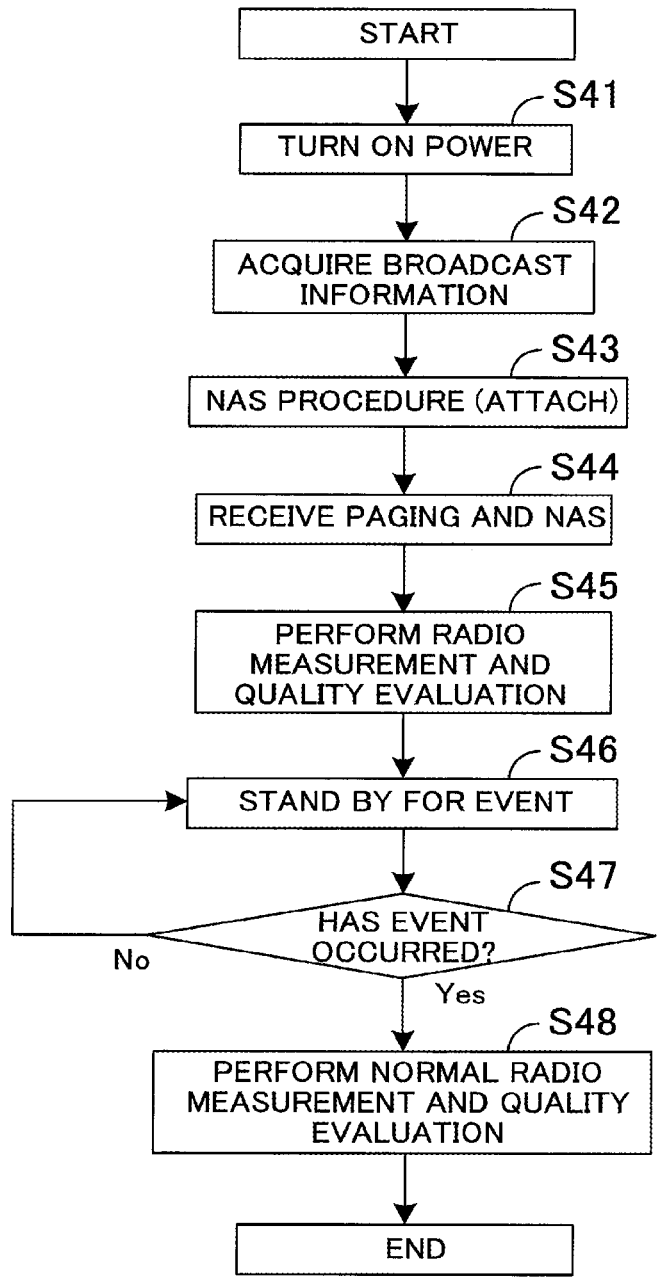
FIG. 16 is a flowchart of a radio terminal.

FIG. 16 is a flowchart of a radio terminal.

(Step S41) The power of the radio terminal 12 is turned on.

(Step S42) The control plane layer controller 22*b* receives broadcast information from the base station 11.

(Step S43) The control plane layer controller 22*b* performs the NAS Attach procedure.

(Step S44) The control plane layer controller 22*b* receives the DRX to be performed next by a paging signal or by performing the NAS Attach procedure.

(Step S45) The control plane layer controller 22*b* controls the radio controller 22*a* so as to perform the DRX specified by the base station 11 (step S44). The control plane layer controller 22*b* performs measurement by the DRX and makes an evaluation thereof.

(Step S46) The application layer controller 22*c* stands by for an event.

(Step S47) The application layer controller 22*c* determines whether or not the event has occurred. In the case where the event has occurred, the application layer controller 22*c* proceeds to step S48. In the case where no event has occurred, the application layer controller 22*c* proceeds to step S46.

(Step S48) The control plane layer controller 22*b* performs all the DRXs. For example, as illustrated after the occurrence of the event in FIG. 15, the control plane layer controller 22*b* controls the radio controller 22*a* so that measurement and monitoring of a paging signal are performed in each DRX cycle.

Figure 17:
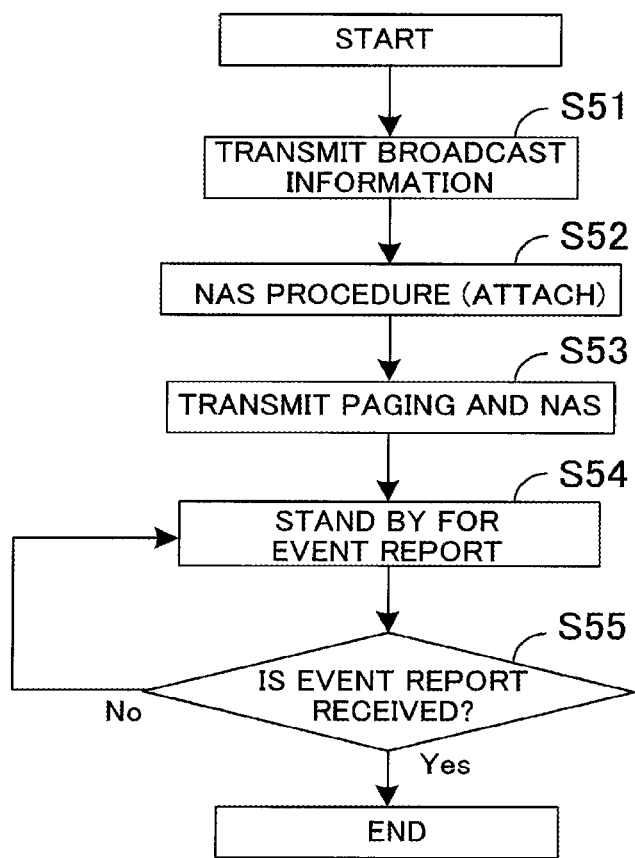
FIG. 17 is a flowchart of a base station.

FIG. 17 is a flowchart of a base station.

(Step S51) The control plane layer controller 42*b* notifies the radio terminal 12 of broadcast information via the radio controller 42*a*.

(Step S52) The control plane layer controller 42*b* performs the NAS Attach procedure.

(Step S53) The control plane layer controller 42*b* transmits the DRX to be performed next by a paging signal or by performing the NAS Attach procedure.

(Step S54) The control plane layer controller 42*b* stands by for an event report from the radio terminal 12.

(Step S55) The control plane layer controller 42*b* determines whether or not to have received an event report from the radio terminal 12. In the case of having received an event report from the radio terminal 12, the control plane layer controller 42*b* ends the processing. In the case of not having received an event report from the radio terminal 12, the control plane layer controller 42*b* proceeds to step S54.

As described above, the control plane layer controller 42*b* receives the DRX to be performed next by a paging signal or the NAS. Then, the control plane layer controller 42*b* and the radio controller 42*a* perform filtering of measurement at intervals less than half the cycle length of the DRX cycle within the DRX cycle of the DRX to be performed next. Due to this, the radio terminal 12 may suppress deterioration in measurement as well as suppressing power consumption.

Fifth Embodiment

Next, a fifth embodiment is explained in detail with reference to drawings. In the fifth embodiment, two DRX cycles are set and measurement and monitoring of a paging signal are performed.

The radio communication system according to the fifth embodiment is the same as that in FIG. 2. The block of the radio terminal 12 is the same as that in FIG. 3, but the function of the control plane layer controller 22*b* is different. The hardware configuration of the radio terminal 12 is the same as that in FIG. 4. The block of the base station 11 is the same as that in FIG. 5, but the function of the control plane layer controller 42*b* is different. The hardware configuration of the base station 11 is the same as that in FIG. 6.

Figure 18:
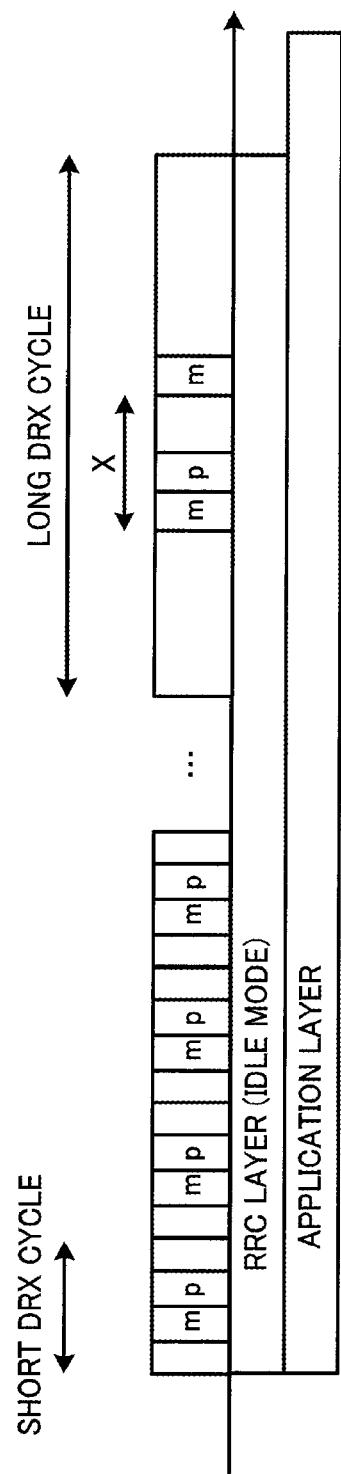
FIG. 18 is a timing chart of a radio terminal according to a fifth embodiment.

FIG. 18 is a timing chart of a radio terminal according to the fifth embodiment. FIG. 18 illustrates a short DRX cycle and a long DRX cycle whose period of time is longer than that of the short DRX cycle. The short DRX cycle is, for example, the conventional DRX cycle and the long DRX cycle is made longer in cycle than the short DRX cycle in order to suppress power consumption of the radio terminal 12.

The radio terminal 12 performs the DRX in the short DRX cycle, for example, for a predetermined period of time and after that, performs the DRX in the long DRX cycle for a predetermined period of time. Then, the radio terminal 12 repeats these operations. The period of time during which the DRX in the short DRX cycle is performed and the period of time during which the DRX in the long DRX cycle is performed are notified by broadcast information, for example.

If the DRX cycle is lengthened simply, the interval of time during which measurement is performed is also lengthened, and therefore, the control plane layer controller 22*b* of the radio terminal 12 performs measurement, within the long DRX, at least once with conventional intervals of the DRX. Consequently, it is possible to perform measurement a plurality of times within a DRX duration. However, measurement is performed with intervals of 'long DRX cycle/n' (n>2). Consequently, the radio terminal 12 performs control so as to perform filtering of measurement at least with an interval of 'X' as illustrated in FIG. 18. The control plane layer controller 22*b* may perform measurement as conventionally in the short DRX cycle, but in order to improve measurement accuracy, performs filtering of measurement at least with an interval of 'short DRX cycle/2'.

The radio terminal 12 averages two measurements to calculate a measured value of measurement. For example, the radio terminal 12 performs filtering of two sample values of m on the left side and of m on the right side in the long DRX cycle illustrated in FIG. 18.

As a modification example, if the DRX cycle is lengthened simply, it is obvious that the interval of time during which measurement is performed is lengthened, and therefore, there is also a method in which measurement and monitoring of a paging signal are not at all performed in the long DRX cycle.

In the above, the period of time during which the DRX in the short DRX cycle is performed and the period of time during which the DRX in the long DRX cycle is performed are notified by broadcast information, and here, another example is explained.

Example 1: When the radio terminal 12 camps on, the base station 11 notifies a period of time during which the DRX is performed by a paging signal.

Example 2: When the radio terminal 12 camps on, the location is registered in the MME. The location registration is performed in the NAS layer and the NAS Attach procedure is performed. The radio terminal 12 receives a period of time during which the DRX is performed by the NAS Attach Accept of the NAS message transmitted and received by the NAS Attach procedure.

Example 3: The control plane layer controller 22b performs the DRX in the short DRX cycle N times, and then, performs the DRX in the long DRX cycle M times. The values of N and M may be notified by broadcast information or values determined in advance may be used. Further, the control plane layer controller 22b may calculate the values of N and M from the device ID of the radio terminal 12.

Example 4: The control plane layer controller 22b switches the DRX cycles in conjunction with the BCCH modification period explained in FIG. 12. For example, the control plane layer controller 22b performs the DRX in the short DRX cycle every N modification boundaries (the dotted lines A13, A14 in FIG. 12). The period of time during which the DRX in the short DRX cycle is performed may be notified by, for example, broadcast information or a value determined in advance may be used. Further, the control plane layer controller 22b may calculate a period of time during which the DRX in the short DRX cycle is performed from the device ID of the radio terminal 12.

Example 5: The control plane layer controller 22b starts the DRX in the short DRX cycle in the radio frame in which the SFN mod DRX cycle and the func (IMSI) become equal to each other. The control plane layer controller 22b performs the DRX in the short DRX cycle in N successive radio frames. N may be notified by, for example, broadcast information or a value determined in advance may be used. Further, the control plane layer controller 22b may calculate N from the device ID of the radio terminal 12. When ending the DRX in the short DRX cycle, the control plane layer controller 22b performs the DRX in the long DRX cycle.

Figure 19:
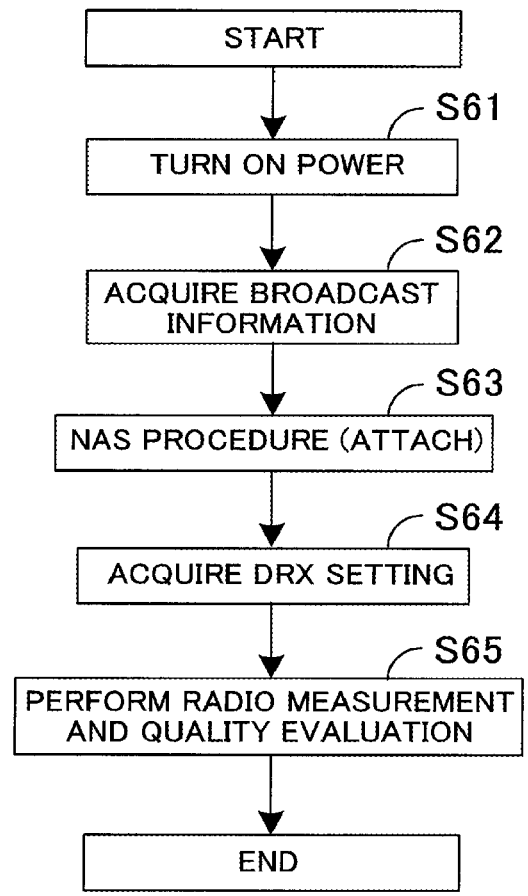
FIG. 19 is a flowchart of a radio terminal.

FIG. 19 is a flowchart of a radio terminal.

(Step S61) The power of the radio terminal 12 is turned on.

(Step S62) The control plane layer controller 22b receives broadcast information from the base station 11.

(Step S63) The control plane layer controller 22b performs the NAS Attach procedure.

(Step S64) The control plane layer controller 22b acquires a period of time during which the DRX in the short DRX cycle is performed and a period of time during which the DRX in the long DRX cycle is performed by the NAS Attach Accept, for example. The control plane layer controller 22b may also acquire a period of time during which the DRX in the short DRX cycle is performed and a period of time during which the DRX in the long DRX cycle is performed from broadcast information.

(Step S65) The control plane layer controller 22b controls the radio controller 22a so as to perform the DRX in the short DRX cycle and in the long DRX cycle specified by the base station 11 (step S64). The control plane layer controller 22b performs measurement by the DRX and makes an evaluation thereof.

Figure 20:
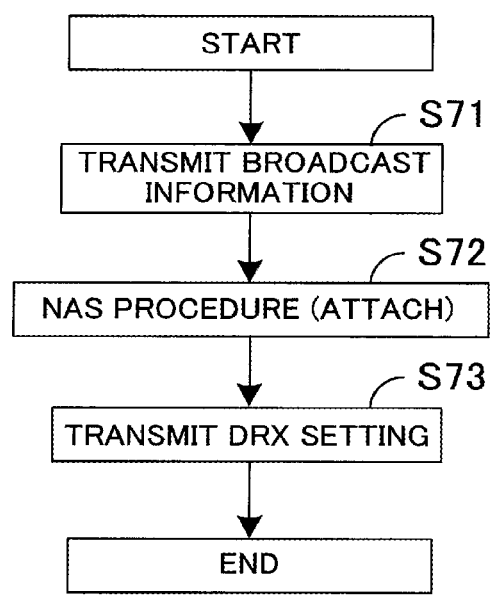
FIG. 20 is a flowchart of a base station.

FIG. 20 is a flowchart of a base station.

(Step S71) The control plane layer controller 42b notifies the radio terminal 12 of broadcast information via the radio controller 42a.

(Step S72) The control plane layer controller 42b performs the NAS Attach procedure.

(Step S73) The control plane layer controller 42b transmits the period of time during which the DRX in the short DRX cycle and the DRX in the long DRX cycle are performed by broadcast information or by performing the NAS Attach procedure, for example.

As described above, the control plane layer controller 42b performs the DRX in the short DRX cycle and in the long DRX cycle. Due to this, the radio terminal 12 may improve accuracy of measurement by the short DRX cycle as well as suppressing power consumption by the long DRX cycle.

Sixth Embodiment

Next, a sixth embodiment is explained in detail with reference to drawings. In the sixth embodiment, after the power of the radio terminal 12 is turned on, the NAS Attach procedure and the NAS Detach procedure are performed. After that, the radio terminal 12 turns off the power of the communication unit 21. After that, if an event is detected in the application layer, the radio terminal 12 performs measurement and monitoring of a paging signal by the DRX and for example, transmits information of the event to the base station 11 by the UL.

The radio communication system according to the six embodiment is the same as that in FIG. 2. The block of the radio terminal 12 is the same as that in FIG. 3, but the function of the control plane layer controller 22b is different. The hardware configuration of the radio terminal 12 is the same as that in FIG. 4. The block of the base station 11 is the same as that in FIG. 5, but the function of the control plane layer controller 42b is different. The hardware configuration of the base station 11 is the same as that in FIG. 6.

Figure 21:
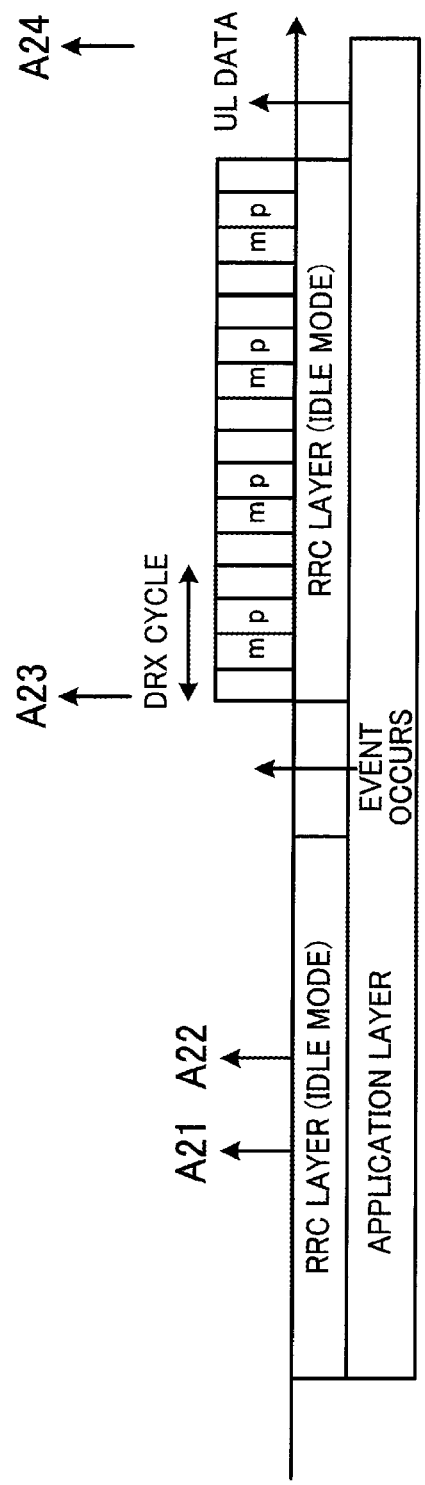
FIG. 21 is a timing chart of a radio terminal according to a sixth embodiment.

FIG. 21 is a timing chart of a radio terminal according to the sixth embodiment. An arrow A21 in FIG. 21 indicates performing of the NAS Attach procedure and an arrow A22 indicates performing of the NAS Detach procedure. When the power is turned on, the radio terminal 12 makes a cell search and registers the location by performing the NAS Attach procedure as indicated by the arrow A21. Then, the radio terminal 12 turns off the power of the communication unit 21 by performing the NAS Detach procedure as indicated by the arrow A22.

When detecting an event having occurred in the application layer, the application layer controller 22c of the radio terminal 12 notifies the control plane layer controller 22b of the detection. The control plane layer controller 22b controls the radio controller 22a so as to turn on the communication unit 21.

The control plane layer controller 22b registers the location by performing the NAS Attach procedure as indicated by an arrow A23. The control plane layer controller 22b performs the DRX in the short DRX cycle to perform measurement and monitoring of a paging signal.

The control plane layer controller 22b transmits event information to the base station 11 as UL data and performs the NAS Detach procedure as indicated by an arrow A24. Then, the control plane layer controller 22b turns off the power of the communication unit 21.

After that, when an event is detected by the application layer controller 22c, the control plane layer controller 22b performs the same operation as that described above.

Figure 22:
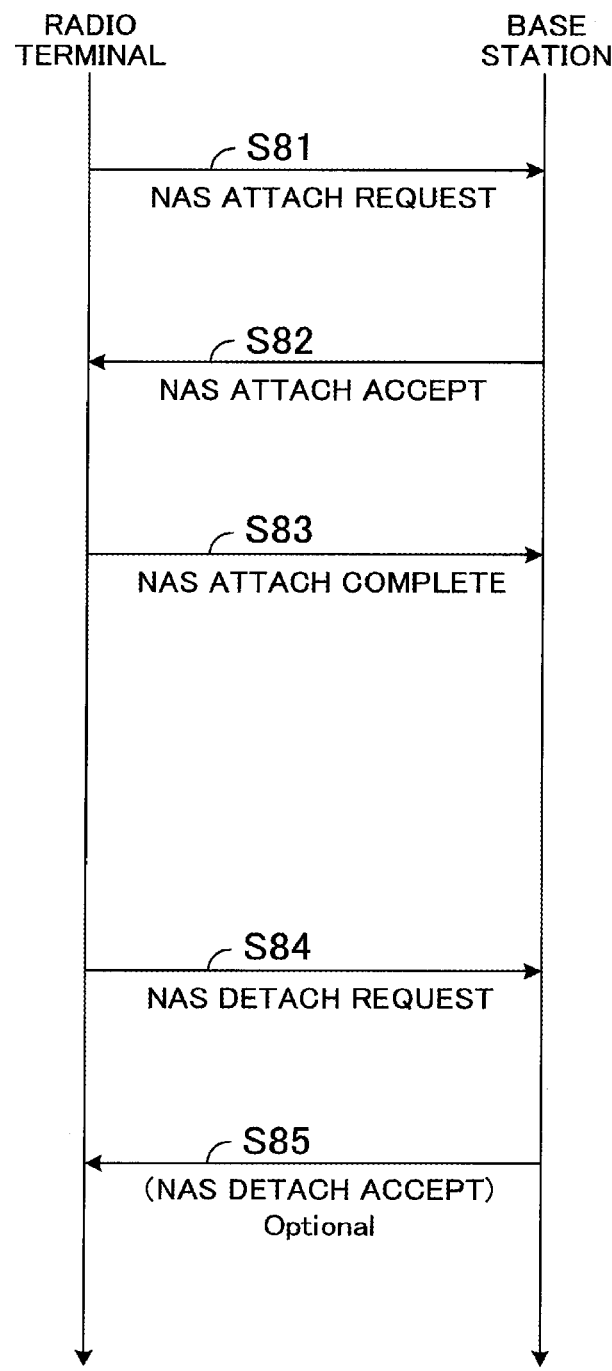
FIG. 22 explains operations of an NAS Attach procedure and an NAS Detach procedure.

FIG. 22 explains the operations of the NAS Attach procedure and the NAS Detach procedure.

(Step S81) The control plane layer controller 22b of the radio terminal 12 transmits an NAS Attach Request to the base station 11.

(Step S82) The control plane layer controller 42b of the base station 11 transmits the NAS Attach Accept to the radio terminal 12.

(Step S83) The control plane layer controller 22b of the radio terminal 12 transmits an NAS Attach Complete to the base station 11.

(Step S84) The control plane layer controller 22b of the radio terminal 12 transmits an NAS Detach Request to the base station 11.

(Step S85) The control plane layer controller 42b of the base station 11 transmits the NAS Detach Accept to the radio terminal 12.

Figure 23:
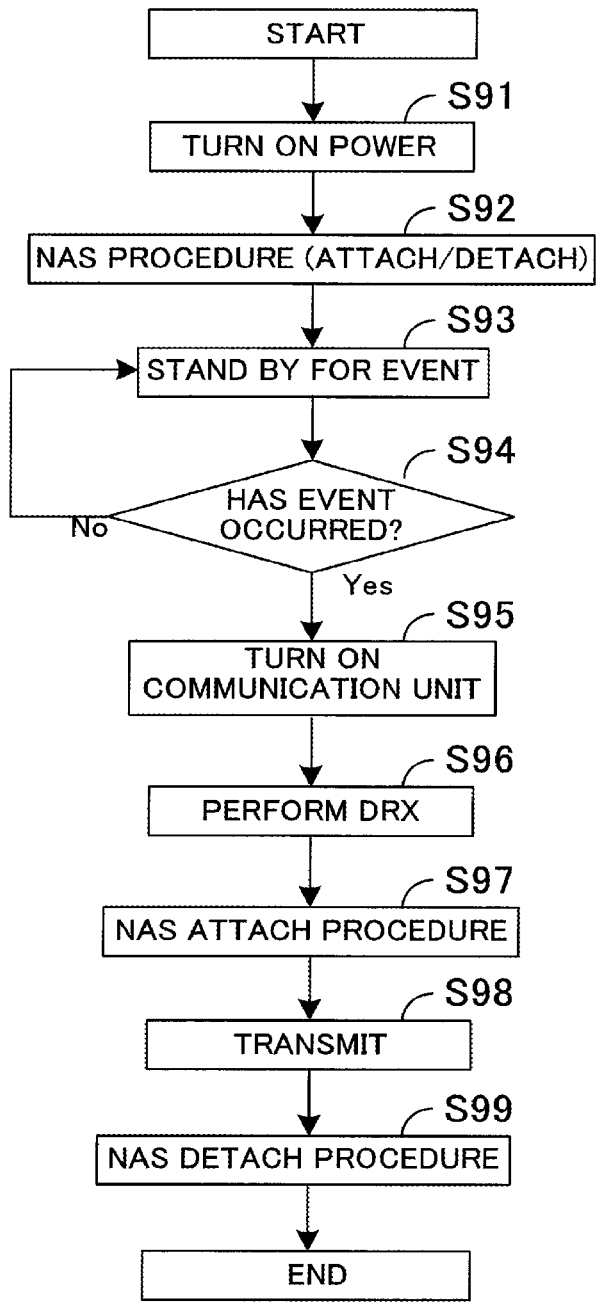
FIG. 23 is a flowchart of a radio terminal.

FIG. 23 is a flowchart of a radio terminal.

(Step S91) The power of the radio terminal 12 is turned on.

(Step S92) The control plane layer controller 22b performs the NAS Attach procedure and the NAS Detach procedure. For example, the control plane layer controller 22b performs what is indicated by the arrow A21 and what is indicated by the arrow A22 illustrated in FIG. 21.

(Step S93) The application layer controller 22c stands by for an event.

(Step S94) The application layer controller 22c determines whether or not an event has occurred. In the case where an event has occurred, the application layer controller 22c proceeds to step S95. In the case where no event has occurred, the application layer controller 22c proceeds to step S93.

(Step S95) The radio controller 22a turns on the communication unit 21 in accordance with the control of the control plane layer controller 22b.

(Step S96) The control plane layer controller 22b causes the DRX to be performed.

(Step S97) The control plane layer controller 22b performs the NAS Attach procedure.

(Step S98) The communication unit 21 transmits event information in the UL to the base station 11.

(Step S99) The control plane layer controller 22b performs the NAS Detach procedure.

Figure 24:
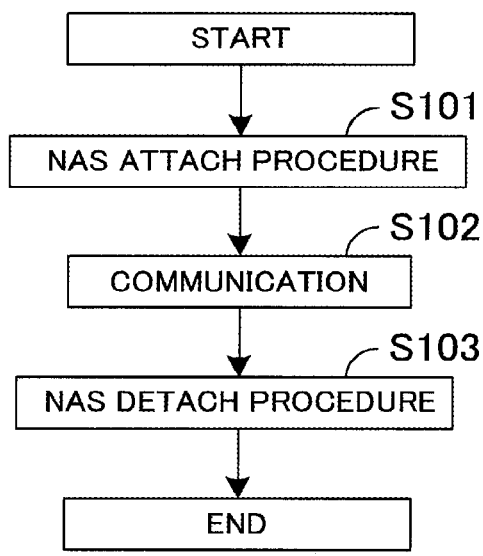
FIG. 24 is a flowchart of a base station.

FIG. 24 is a flowchart of a base station.

(Step S101) The control plane layer controller 42b performs the NAS Attach procedure.

(Step S102) The control plane layer controller 42b communicates with the radio terminal 12 via the radio controller 42a and the communication unit 41.

(Step S103) The control plane layer controller 42b performs the NAS Detach procedure. The above-described processing is the same before and after the event.

As described above, the control plane layer controller 42b controls the radio controller 22a so as to perform the DRX in conjunction with event detection by the application layer controller 22c. Due to this, the radio terminal 12 may suppress power consumption before an event occurs.

According to the disclosed apparatus and method, it is possible to suppress deterioration in measurement.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A radio terminal that performs radio communication with a base station, comprising:
   a communicator configured to perform radio measurement and monitoring of a paging signal of the base station; and
   a controller configured to:
      control the communicator to receive information related to first duration, the information being transmitted from the base station via a first Non-Access Stratum (NAS) message,
      control the communicator to not perform the radio measurement and the monitoring during the first duration, and
      control the communicator to perform repeatedly, according to a predetermined rule, the radio measurement and the monitoring during second duration which is different from the first duration, the predetermined rule relating to a Discontinuous Reception (DRX) cycle in the second duration,
   wherein the controller is further configured to receive a message which is different from the first Non-Access Stratum message from the base station and control the radio measurement and the monitoring during the second duration according to the information.

2. The radio terminal according to claim 1, wherein the message is a second Non-Access Stratum message and the second Non-Access Stratum message is different from the first Non-Access Stratum message.

3. The radio terminal according to claim 1, wherein the information related to the first duration is information relating to length of the first duration.

4. The radio terminal according to claim 1, wherein the first Non-Access Stratum message is an accept message in response to a request message of NAS layer.

5. The radio terminal according to claim 1, wherein the message is the paging signal.

6. A radio communication system comprising of a radio terminal and a base station that performs radio communication with the radio terminal,
   the radio terminal comprising:
   a communicator configured to perform radio measurement and monitoring of a paging signal of the base station; and
   a controller configured to:
      control the communicator to receive information related to first duration, the information being transmitted from the base station via a first Non-Access Stratum (NAS) message,
      control the communicator to not perform the radio measurement and the monitoring during the first duration, and
      control the communicator to perform repeatedly, according to a predetermined rule, the radio measurement and the monitoring during second duration which is different from the first duration, the predetermined rule relating to a Discontinuous Reception (DRX) cycle in the second duration,
   wherein the controller is further configured to receive a message which is different from the first Non-Access Stratum message from the base station and control the radio measurement and the monitoring during the second duration according to the information.

7. A base station that performs radio communication with a radio terminal, the base station comprising:
   a communicator configured to transmit information related to first duration to be set in the radio terminal, the information being transmitted via a Non-Access Stratum (NAS) message to the radio terminal,
   the first duration being duration in which the radio terminal does not perform radio measurement and monitoring of a paging signal of the base station, and second duration which is different from the first duration is a duration in which the radio terminal performs repeatedly the radio measurement and the monitoring according to a predetermined rule relating to a Discontinuous Reception (DRX) cycle in the second duration,
   wherein the communicator is further configured to send a message which is different from the Non-Access Stratum message and the radio terminal that receives the message controls the radio measurement and the monitoring during the second duration.

8. A radio communication method for a radio terminal and a base station that performs radio communication with the radio terminal, the radio communication method comprising:
   by the radio terminal,
   performing radio measurement and monitoring of a paging signal of the base station;
   controlling communication to receive information related to first duration, the information being transmitted from the base station via a first Non-Access Stratum (NAS) message,
   controlling the communication to not perform the radio measurement and the monitoring during the first duration, and
   controlling the communication to perform repeatedly, according to a predetermined rule, the radio measurement and the monitoring during second duration which is different from the first duration, the predetermined rule relating to a Discontinuous Reception (DRX) cycle in the second duration,
   wherein the radio terminal is configured to receive a message which is different from the first Non-Access Stratum message from the base station and control the radio measurement and the monitoring during the second duration according to the information.

* * * * *